United States Patent
Zhong et al.

(10) Patent No.: US 9,578,628 B2
(45) Date of Patent: Feb. 21, 2017

(54) PUCCH RESOURCE CONFIGURATION METHOD, TRANSMISSION METHOD, DEVICE AND SYSTEM

(71) Applicant: ZTE CORPORATION, Shenzhen, Guangdong Province (CN)

(72) Inventors: Liyuan Zhong, Shenzhen (CN); Yunfeng Sun, Shenzhen (CN); Senbao Guo, Shenzhen (CN); Feng Bi, Shenzhen (CN); Yuhong Gong, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 223 days.

(21) Appl. No.: 14/355,842

(22) PCT Filed: Nov. 2, 2012

(86) PCT No.: PCT/CN2012/084031
§ 371 (c)(1),
(2) Date: May 1, 2014

(87) PCT Pub. No.: WO2013/064106
PCT Pub. Date: May 10, 2013

(65) Prior Publication Data
US 2014/0301338 A1 Oct. 9, 2014

(30) Foreign Application Priority Data
Nov. 2, 2011 (CN) .......................... 2011 1 0342316

(51) Int. Cl.
*H04W 72/04* (2009.01)
*H04W 28/02* (2009.01)
(Continued)

(52) U.S. Cl.
CPC ........ *H04W 72/0413* (2013.01); *H04L 1/1861* (2013.01); *H04L 5/0035* (2013.01);
(Continued)

(58) Field of Classification Search
CPC ........... H04W 84/025; H04W 28/0205; H04W 28/0231; H04W 28/0252; H04W 72/12; H04W 72/1205; H04W 72/1263; H04W 72/1278; H04W 72/04; H04W 72/0406; H04W 72/0413; H04W 72/042
See application file for complete search history.

(56) References Cited

U.S. PATENT DOCUMENTS

2013/0034064 A1* 2/2013 Nam ................. H04W 72/1294
370/329

FOREIGN PATENT DOCUMENTS

| CN | 102045140 A | 5/2011 |
|---|---|---|
| CN | 102215094 A | 10/2011 |
| WO | 2011083068 A1 | 7/2011 |

OTHER PUBLICATIONS

LG Electronics Uplink Control Signals for CoMP.3GPPTSG RAN WG1 Meeting #66bis.R1-113282. Oct. 14, 2011. http://www.3gpp.org/ftp/tsg_ran/WG1_RL1/TSGR1_66b/Docs/R1-113282.zip.
(Continued)

*Primary Examiner* — Ashley Shivers
(74) *Attorney, Agent, or Firm* — Fulwider Patton LLP

(57) ABSTRACT

Provided are a PUCCH resource configuration method, transmission method, device and system. The method includes: allocating dedicated PRBs for UEs configured to transmit uplink control information using an enhanced PUCCH, which step comprising: taking the UEs configured to transmit the uplink control information using the enhanced PUCCH as a first type of UEs, and taking UEs other than the first type of UEs as a second type of UEs; and reserving a designated number of PRBs according to the number of UEs in the first type of UEs, wherein the designated number of PRBs are located between SR/semi-
(Continued)

Allocate dedicated PRBs for UEs configured to transmit uplink control information using an enhanced PUCCH, wherein allocating the dedicated PRBs for the UEs configured to transmit the uplink control information using the enhanced PUCCH comprises: taking the UEs configured to transmit the uplink control information using the enhanced PUCCH as a first type of UEs, and taking UEs other than the first type of UEs as a second type of UEs; and reserving a designated number of PRBs according to the number of the first type of UEs, wherein the designated number of PRBs are located between SR as well as semi-static ACK/NACK resources of the second type of UEs, and dynamic ACK/NACK resources of the second type of UEs, and taking the designated number of PRBs as dedicated PRBs for the first type of UEs — S302

Allocate orthogonal resources for UEs located in different cells among the first type of UEs based on the dedicated PRBs — S304 static ACK/NACK resources of the second type of UEs and dynamic ACK/NACK resources of the second type of UEs, and taking the designated number of PRBs as dedicated PRBs for the first type of UEs; and allocating orthogonal resources for UEs located in different cells among the first type of UEs based on the dedicated PRBs. The disclosure solves the problem of great interference between PUCCH from different cells and ensuring the receiving quality of the PUCCH.

18 Claims, 8 Drawing Sheets

(51) Int. Cl.
  *H04L 5/00* (2006.01)
  *H04L 1/18* (2006.01)

(52) U.S. Cl.
  CPC .......... *H04L 5/0037* (2013.01); *H04L 5/0055* (2013.01); *H04W 28/0252* (2013.01); *H04L 5/0073* (2013.01)

(56) References Cited

OTHER PUBLICATIONS

International Search Report, dated Feb. 1, 2013, pp. 1-3.

* cited by examiner

Allocate dedicated PRBs for UEs configured to transmit uplink control information using an enhanced PUCCH, wherein allocating the dedicated PRBs for the UEs configured to transmit the uplink control information using the enhanced PUCCH comprises: taking the UEs configured to transmit the uplink control information using the enhanced PUCCH as a first type of UEs, and taking UEs other than the first type of UEs as a second type of UEs; and reserving a designated number of PRBs according to the number of the first type of UEs, wherein the designated number of PRBs are located between SR as well as semi-static ACK/ NACK resources of the second type of UEs, and dynamic ACK/ NACK resources of the second type of UEs, and taking the designated number of PRBs as dedicated PRBs for the first type of UEs — S302

Allocate orthogonal resources for UEs located in different cells among the first type of UEs based on the dedicated PRBs — S304

Fig. 3

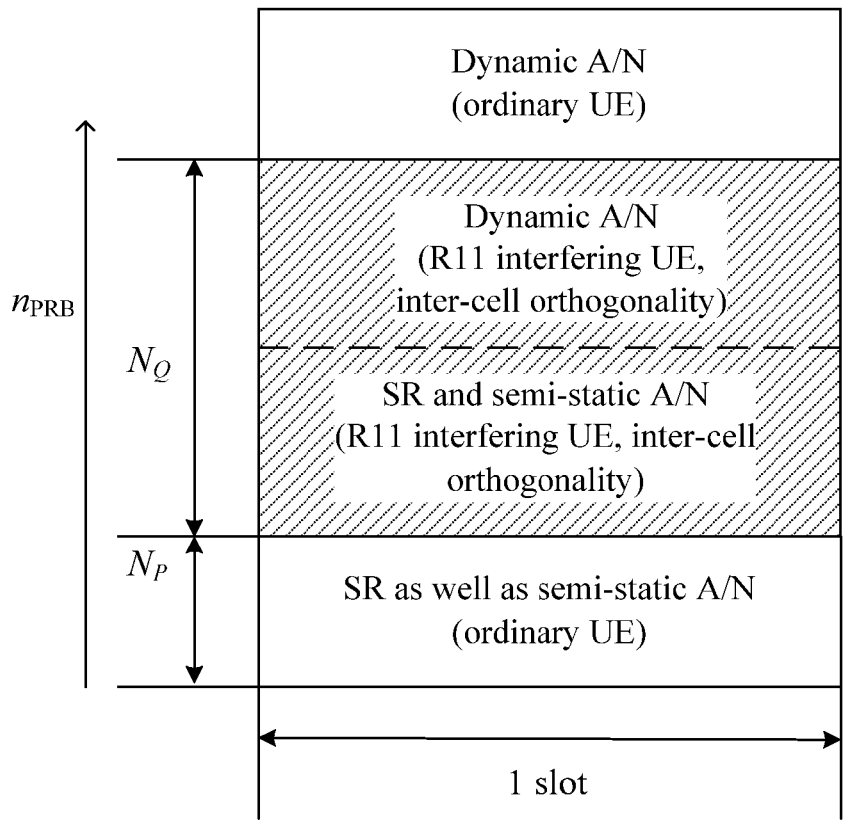

Fig. 4

PUCCH RESOURCE CONFIGURATION METHOD, TRANSMISSION METHOD, DEVICE AND SYSTEM

CROSS-REFERENCES TO RELATED APPLICATIONS

This is a U.S. national phase application of PCT/CN2012084031, filed Nov. 2, 2012, which claims priority to Chinese Patent Application No. 201110342316.5, filed Nov. 2, 2011 incorporated herein by reference.

FIELD OF THE INVENTION

The disclosure relates to the communication field, and in particular, to a physical uplink control channel (PUCCH) resource configuration method, transmission method, device and system.

BACKGROUND

In LTE-A, in order to improve the cell average spectrum utilization efficiency and the cell edge spectrum utilization efficiency, Coordinated Multi Point Transmission/Reception (CoMP) technology is employed. CoMP technology is classified into DL CoMP (downlink CoMP) and UL CoMP (uplink CoMP), both of which can improve the average spectrum efficiency of a cell and the quality of service of a cell edge user to a great extent. CoMP is divided into the following four scenarios:

scenario 1: a homogeneous network with intra-site CoMP;

scenario 2: a homogeneous network with high transmit power (Tx) RRHs (Remote radio head);

scenario 3: a heterogeneous network with low power RRHs within the macro cell coverage, wherein the RRHs and the macro cell have different cell IDs;

scenario 4: a heterogeneous network with low power RRHs within the macro cell coverage, wherein the RRHs and the macro cell have the same virtual cell IDs.

In LTE R8/R9/R10 protocol versions, the formats of the PUCCH channel can be divided into three categories, seven types of formats totally. The first type contains three formats, i.e., format1, format1a and format1b, the second type also contains three formats, i.e., format2, format2a and format2b, and the third type contains one format, i.e., format3. The first type of PUCCH is used for transmitting scheduling request (SR) and acknowledgement (ACK)/negative acknowledgement (NACK) signalling. The second type of PUCCH is mainly used for transmitting channel state information (CSI). Currently, the third type of PUCCH is mainly used for feeding back the ACK/NACK signalling of a plurality of cells in the case that the UE is configured with a plurality of serving cells under the carrier aggregation scenario. As shown in FIG. 1, it is a schematic diagram showing the resource allocation of a PUCCH on one slot. In FIG. 1, the mixed resource block (RB) represents that both the format1/1a/1b and the format2/2a/2b exist in this RB at the same time, and there is at most one mixed RB in one slot; the parameter $N^{(2)}_{RB}$ represents the number of physical resource blocks (PRBs) occupied by format2/2a/2b, and this parameter is configured by the upper layer.

For the first type of PUCCHs, the available resource n_r is represented by three sub-resources, which are respectively: (n_cs, n_oc, n_PRB), wherein n_cs represents the resource sequence number of cyclic shift (CS), n_oc represents the resource sequence number of orthogonal code (OC), and n_PRB represents the resource sequence number of PRB. These three sub-resources are in a one-to-one correspondence with the resource index $n^{(1,p)}_{PUCCH}$. For the second type of PUCCHs, the available resource n_r is represented by two sub-resources, which are respectively: (n_cs, n_PRB). The available resources of the second type of PUCCHs are in a one-to-one correspondence with the resource index $n^{(2,p)}_{PUCCH}$. For the third type of PUCCHs, the available resource n_r is represented by two sub-resources, which are respectively: (n_oc, n_PRB). The available resources of the third type of PUCCHs are in a one-to-one correspondence with the resource index $n^{(3,p)}_{PUCCH}$.

The resource index $n^{(1)}_{PUCCH}$ of format 1 in the first type of PUCCHs is configured by the upper layer. The value of the resource index $n^{(1)}_{PUCCH}$ of PUCCH format 1a/1b on subframe n can be obtained by two methods, which will be described as follows by taking the case where the UE is configured with one serving cell in a frequency division duplex (FDD) system as an example.

If the physical downlink shared channel (PDSCH) on subframe n-4 of the main serving cell does not detect the corresponding physical downlink control channel (PDCCH), then the above-mentioned $n^{(1,p)}_{PUCCH}$ will be obtained according to upper-layer configuration and Table 1, and such kind of ACK/NACK is referred to as semi-static ACK/NACK (which can also be referred to as semi-static A/N) herein.

If the PDSCH on subframe n-4 of the main serving cell detects a corresponding PDCCH, or this PDCCH is used for indicating downlink semi-static scheduling (SPS) release, then the above-mentioned $n^{(1,p)}_{PUCCH}$ will be obtained according to the following manner $n^{(1,p=p_0)}_{PUCCH}=n_{CCE}+N^{(1)}_{PUCCH}$, where $n_{CCE}$ represents the index of the first control channel element (CCE) of the PDCCH, $N^{(1)}_{PUCCH}$ is a parameter configured by the upper layer and represents the number of resource indexes reserved for SRs and semi-static ACK/NACK (which can also be referred to as SR as well as semi-static A/N). FIG. 2 is a schematic diagram showing the resource index configuration of a PUCCH. For the channel resources of the second antenna port, $n^{(1,p)}_{PUCCH}$ will be obtained in the following manner: $n^{(1,p=p_1)}_{PUCCH}=n_{CCE}+1+N^{(1)}_{PUCCH}$, and such kind of ACK/NACK is referred to as dynamic ACK/NACK (which can also be referred to as dynamic A/N).

TABLE 1

| TPC domain | $n_{PUCCH}^{(1, p)}$ |
|---|---|
| '00' | The first PUCCH resource value configured by the upper layer |
| '01' | The second PUCCH resource value configured by the upper layer |
| '10' | The third PUCCH resource value configured by the upper layer |
| '11' | The fourth PUCCH resource value configured by the upper layer |

In this table, the transmission power control (TPC) domain is on a corresponding PDCCH.

$n^{(2,p)}_{PUCCH}$ is configured by the upper layer. The resource index $n^{(3,p)}_{PUCCH}$ of the third type of PUCCHs is obtained according to upper-layer configuration and Table 2.

TABLE 2

| TPC domain | $n_{PUCCH}^{(3, p)}$ |
|---|---|
| '00' | The first PUCCH resource value configured by the upper layer |

TABLE 2-continued

| TPC domain | $n_{PUCCH}^{(3, p)}$ |
|---|---|
| '01' | The second PUCCH resource value configured by the upper layer |
| '10' | The third PUCCH resource value configured by the upper layer |
| '11' | The fourth PUCCH resource value configured by the upper layer |

Then, after the available resource is obtained according to the resource index and the parameter configured by the upper layer, a channelization process will be performed, wherein the channelization processes of different formats of PUCCHs are different, which will be described simply hereinafter respectively.

The channelization process of format1/1a/1b is as follows: a data bit is modulated, then multiplied with CS and expanded to 12 subcarriers, then multiplied with OC code to realize time domain expansion, and then is subjected to code channel scrambling, and the obtained symbol will be mapped to a corresponding PRB.

The channelization process of format2/2a/2b is as follows: a data bit is scrambled first, then modulated, then multiplied with CS, and the obtained symbol will be mapped to a corresponding PRB.

The channelization process of format 3 is as follows: a data bit is scrambled first, then modulated, then multiplied with OC code and phase rotated, then cyclic shifted at a cell-specific symbol level, and discrete Fourier transformed (DFT) and then mapped to a corresponding PRB.

In LTE R8/R9/R10 protocol versions, a user equipment (UE) corresponds to one PUCCH channel. For a PUCCH channel, different UEs in a cell are multiplexed in a code division multiplexing (CDM) or frequency division multiplexing (FDM) manner, wherein the UEs are allocated to different PRBs in the FDM manner, and the UEs adopt different cyclic shift sequences (CSs) or different orthogonal codes (OCs) in the CDM manner. Here, different cyclic shift sequences refer to different cyclic shifts corresponding to the same root sequence. The root sequence is a computer-generated constant amplitude zero auto-correlation (CG-CAZAC) sequence with a length of 12, different cyclic shifts of the same root sequence are orthogonal to each other, and different root sequences are not orthogonal to each other. The root sequence is in a one-to-one correspondence with the cell ID. Therefore, the PUCCHs within the same cell are orthogonal to each other, and the PUCCHs from different cells with different cell IDs are not orthogonal to each other.

In LTE R10 protocol version, in order to reduce inter-cell interference, inter-cell interference randomization is performed for all PUCCH formats by using cyclic shift at a cell-specific symbol level.

Therefore, in LTE R8/R9/R10 protocol versions, when cell IDs are different, the PUCCHs among cells are not orthogonal. In CoMP scenario 3, the cell IDs of the macro cell and the RRH are different, while the UE of the macro cell and the UE of the RRH may send the PUCCH over the same time frequency resource, and in this case, the PUCCHs of the two UEs are not orthogonal. When the UE of the macro cell is at the edge of the RRH coverage and the power of the sent PUCCH is relatively large, if the power of this PUCCH reaching the RRH is comparable to the PUCCH power sent by the RRH UE or greater than the PUCCH power of the RRH UE, the PUCCH sent by the RRH UE will be interfered seriously, which renders the quality of the PUCCH signal received by the RRH to be very poor. In the case of joint reception of uplink (UL) CoMP, a plurality of nodes jointly receive the PUCCH sent by the same UE, if the target PUCCH comes from a neighbour cell, the PUCCH from the current cell will interfere with the target PUCCH since this target PUCCH is not orthogonal to the PUCCH in the current cell, which renders the receiving quality of the target PUCCH to be very poor and seriously affects the CoMP gain.

Aiming at the problem of great interference between PUCCHs from different cells in the related art, no effective solution has been presented currently.

SUMMARY OF THE INVENTION

Aiming at the problem of great interference between PUCCHs from different cells in the related art, the embodiments of the disclosure provide a PUCCH resource configuration method, transmission method, device and system, so as to at least solve the above-mentioned problem.

According to one aspect of the embodiments of the disclosure, a PUCCH resource configuration method is provided, including: allocating dedicated PRBs for UEs configured to transmit uplink control information using an enhanced PUCCH, wherein allocating the dedicated PRBs for the UEs configured to transmit the uplink control information using the enhanced PUCCH includes: taking the UEs configured to transmit the uplink control information using the enhanced PUCCH as a first type of UEs, and taking UEs other than the first type of UEs as a second type of UEs; and reserving a designated number of PRBs according to the number of UEs in the first type of UEs, wherein the designated number of PRBs are located between scheduling request (SR) as well as semi-static acknowledgement (ACK)/negative acknowledgement (NACK) resources of the second type of UEs, and dynamic ACK/NACK resources of the second type of UEs, and taking the designated number of PRBs as dedicated PRBs for the first type of UEs; and allocating orthogonal resources for UEs located in different cells among the first type of UEs based on the dedicated PRBs.

Preferably, allocating orthogonal resources for UEs located in different cells among the first type of UEs based on the dedicated PRBs includes: calculating the total number $N^{(1)}_{PUCCH}$ of reserved resource indices and a downward offset value $\Delta^{(1)}_{PUCCH}$ according to access situations of the first type of UEs and the second type of UEs, wherein $\Delta^{(1)}_{PUCCH}$ is the number of dynamic ACK/NACK resource indices in the dedicated PRBs; and notifying the first type of UEs of the $\Delta^{(1)}_{PUCCH}$ via upper-layer signalling.

Preferably, allocating orthogonal resources for UEs located in different cells among the first type of UEs based on the dedicated PRBs includes: calculating, according to the number of UEs in the first type of UEs and the number of the second type of UEs, the total number of reserved resource indices $N^{(1)}_{PUCCH, second\ type\ of\ UEs}$ and the number $N^{(1)}_{PUCCH, first\ type\ of\ UEs}$ of resource indices of SR as well as semi-static ACK/NACK reserved for the first type of UEs and the second type of UEs; and notifying the first type of UEs and the second type of UEs of $N^{(1)}_{PUCCH, first\ type\ of\ UEs}$ and $N^{(1)}_{PUCCH, second\ type\ of\ UEs}$ respectively via upper-layer signalling.

Preferably, allocating orthogonal resources for UEs located in different cells among the first type of UEs based on the dedicated PRBs includes: setting a virtual cell identifier (ID) for each of the first type of UEs.

Preferably, the virtual cell ID is set for each of the first type of UEs in one of the following manners: setting a fixed virtual cell ID and configuring the cell ID to a corresponding UE in the first type of UEs; selecting a virtual cell ID and notifying a corresponding UE in the first type of UEs of the cell ID via upper-layer signalling; indicating a plurality of virtual cell IDs to the first type of UEs via upper-layer signalling and indicating a currently used cell ID via a corresponding physical downlink control channel (PD-CCH); and notifying a corresponding UE in the first type of UEs of a virtual cell ID via a PDCCH.

Preferably, allocating the dedicated PRBs for the UEs configured to transmit the uplink control information using the enhanced PUCCH includes: allocating resource indices for the UEs configured to transmit the uplink control information using the enhanced PUCCH, wherein resource indices allocated to UEs located in different cells among the UEs configured to transmit the uplink control information using the enhanced PUCCH correspond to different PRBs.

Preferably, the manner for allocating resource indices for the UEs configured to transmit the uplink control information using the enhanced PUCCH includes: allocating a designated number of resource values for each UE among the UEs configured to transmit the uplink control information using the enhanced PUCCH, and indicating a resource value currently used by each UE via a corresponding physical downlink control channel (PDCCH).

According to another aspect of the disclosure, a physical uplink control channel (PUCCH) transmission method is provided, including: a user equipment (UE) among a first type of UEs determining a resource index allocated to the UE according to network indication and a preconfigured resource determination manner, wherein the first type of UEs are UEs configured to transmit uplink control information using an enhanced PUCCH, and the first type of UEs transmit a PUCCH according to the determined resource index.

Preferably, the network indication includes the total number of reserved resource indices $N^{(1)}_{PUCCH}$ and a downward offset value $\Delta^{(1)}_{PUCCH}$, and a UE among the first type of UEs determining the resource index allocated to the UE according to the network indication and the preconfigured resource determination manner includes: after receiving the $N^{(1)}_{PUCCH}$ and $\Delta^{(1)}_{PUCCH}$, the UE among the first type of UEs setting a dynamic ACK/NACK resource index to be a formula, whereby the second type of UEs calculate a dynamic ACK/NACK resource index, subtracting $\Delta^{(1)}_{PUCCH}$, wherein the second type of UEs are UEs other than the first type of UEs.

Preferably, the network indication includes: the number $N^{(1)}_{PUCCH, first\ type\ of\ UEs}$ of resource indices of SR as well as semi-static ACK/NACK reserved for the first type of UEs and the second type of UEs, and the total number $N^{(1)}_{PUCCH, second\ type\ of\ UEs}$ of reserved resource indices, wherein the second type of UEs are UEs other than the first type of UEs; the UE among the first type of UEs determining the resource index allocated to the UE according to the network indication and the preconfigured resource determination manner includes: after receiving $N^{(1)}_{PUCCH, first\ type\ of\ UEs}$, the first type of UEs determines a starting position of a dynamic ACK/NACK area according to $N^{(1)}_{PUCCH, first\ type\ of\ UEs}$; the method further includes: after the second type of UEs receives $N^{(1)}_{PUCCH, second\ type\ of\ UEs}$, the second type of UEs determining a starting position of a dynamic ACK/NACK area according to $N^{(1)}_{PUCCH, second\ type\ of\ UEs}$.

Preferably, the method further includes: when transmitting a PUCCH, the UE among the first type of UEs obtaining a cyclic shift root sequence according to a set virtual cell ID and performing channelization on the PUCCH according to the cyclic shift root sequence.

Preferably, the UE among the first type of UEs determining the resource index allocated to the UE according to the network indication and the preconfigured resource determination manner includes: the UE among the first type of UEs determining the current resource index according to upper-layer parameters and corresponding PDCCH indication.

According to still another aspect of the disclosure, a physical uplink control channel (PUCCH) resource configuration device is provided, including: a resource allocation module configured to allocate dedicated PRBs for UEs configured to transmit uplink control information using an enhanced PUCCH, wherein the resource allocation module is configured to allocate the dedicated PRBs for the UEs configured to transmit the uplink control information using the enhanced PUCCH in the following manner: taking the UEs configured to transmit the uplink control information using the enhanced PUCCH as a first type of UEs, and taking UEs other than the first type of UEs as a second type of UEs; and reserving a designated number of PRBs according to the number of UEs in the first type of UEs, wherein the designated number of PRBs are located between scheduling request (SR) as well as semi-static acknowledgement (ACK)/negative acknowledgement (NACK) resources of the second type of UEs, and dynamic ACK/NACK resources of the second type of UEs, and taking the designated number of PRBs as dedicated PRBs for the first type of UEs; and a resource indication module configured to allocate orthogonal resources for UEs located in different cells among the first type of UEs based on the dedicated PRBs allocated by the resource allocation module.

Preferably, the resource allocation module includes: a user classification unit configured to take the UEs configured to transmit the uplink control information using the enhanced PUCCH as the first type of UEs, and take the UEs other than the first type of UEs as the second type of UEs; a resource reservation unit configured to reserve the designated number of PRBs according to the number of UEs in the first type of UEs, wherein the designated number of PRBs are located between the SR as well as semi-static ACK/NACK resources of the second type of UEs, and dynamic ACK/NACK resources of the second type of UEs; and a resource determination unit configured to take the designated number of PRBs reserved by the resource reservation unit as the dedicated PRBs for the first type of UEs.

Preferably, the resource allocation module includes: a resource allocation unit configured to allocate resource indices for UEs configured to transmit the uplink control information using the enhanced PUCCH, wherein the resource indices allocated to UEs located in different cells among the UEs configured to transmit the uplink control information using the enhanced PUCCH correspond to different PRBs.

According to still another aspect of the disclosure, a physical uplink control channel (PUCCH) transmission device is provided, and the device is deployed in a user equipment (UE) configured to transmit uplink control information using an enhanced PUCCH and includes: a resource index determination module configured to determine a resource index allocated to the UE according to network indication and a preconfigured resource determination manner; and a PUCCH transmission module configured to transmit a PUCCH the resource index determined by the resource index determination module.

According to still another aspect of the disclosure, a physical uplink control channel (PUCCH) transmission system is provided, including: a base station and a user equipment (UE), wherein the base station includes the above PUCCH resource configuration device; and the UE includes the above PUCCH transmission device.

According to an aspect of the disclosure, a physical uplink control channel (PUCCH) resource configuration and transmission method is provided, including: allocating a user-dedicated dynamic acknowledgement (ACK)/negative acknowledgement (NACK) resource starting position and a user-dedicated virtual cell identifier for a PUCCH of a user equipment; and the user equipment sending a PUCCH sequence over the PUCCH resource according to the virtual cell identifier (ID).

Preferably, a dynamic ACK/NACK resource index of the PUCCH of the user equipment is obtained according to the user-dedicated dynamic ACK/NACK resource starting position and a lowest control channel element (CCE) index of a corresponding downlink control channel of a user.

Preferably, the user-dedicated dynamic ACK/NACK resource starting position includes: a designated number of physical resource blocks reserved for the user equipment by user-specific upper-layer signalling, wherein the designated number of physical resource blocks are located between scheduling request (SR) as well as semi-static ACK/NACK resources of the user equipment, and dynamic ACK/NACK resources of the user equipment.

Preferably, the designated number of physical resource blocks are obtained according to the total number $N^{(1)}_{PUCCH}$ of reserved resource indices of the SR as well as semi-static ACK/NACK resources of the PUCCH, and an offset value $\Delta^{(1)}_{PUCCH}$; where $N^{(1)}_{PUCCH}$ is an existing parameter in a standard, and $\Delta^{(1)}_{PUCCH}$ is notified to the user equipment via user-specific upper-layer signalling, or via physical layer signalling, or by designating one value via physical layer signalling from multiple values configured by upper-layer.

Preferably, the designated number of physical resource blocks are obtained according to the total number $N^{(1)}_{PUCCH,UE}$ of reserved resource indices of the SR as well as semi-static ACK/NACK resources of the PUCCH; where $N^{(1)}_{PUCCH,UE}$ is notified to the user equipment via user-specific upper-layer signalling, or via physical layer signalling, or by designating one value via physical layer signalling from a plurality of values configured by upper-layer.

Preferably, the method further includes: the user equipment obtaining a cyclic shift root sequence of the PUCCH of the user equipment according to the virtual cell ID.

Preferably, the virtual cell ID is obtained in one of the following manners: setting a fixed virtual cell ID, and configuring the virtual cell ID to the user equipment; selecting a virtual cell ID, and notifying the user equipment of the virtual cell ID via upper-layer signalling; indicating a plurality of virtual cell IDs to the user equipment via upper-layer signalling, and indicating a currently used cell ID via physical downlink control signalling; and notifying the user equipment of a virtual cell ID via physical downlink control signalling.

According to another aspect of the disclosure, a physical uplink control channel (PUCCH) resource configuration device is provided, including: an allocation module configured to allocate a user-dedicated dynamic acknowledgement (ACK)/negative acknowledgement (NACK) resource starting position and a user-dedicated virtual cell identifier (ID) for a PUCCH of a user equipment; and a configuration module configured to configure the virtual cell ID to the user equipment.

Preferably, the configuration module includes: a first configuration unit configured to set a fixed virtual cell ID, and configure the virtual cell ID to the user equipment; or, a second configuration unit configured to select a virtual cell ID, and notify the user equipment of the virtual cell ID via upper-layer signalling; or, a third configuration unit configured to indicate a plurality of virtual cell IDs to the user equipment via upper-layer signalling, and indicate a currently used cell ID via physical downlink control signalling; or, a fourth configuration unit configured to notify the user equipment of a virtual cell ID via physical downlink control signalling.

According to another aspect of the disclosure, a physical uplink control channel (PUCCH) resource information sending device is provided, including: an acquisition module configured to acquire a user-dedicated virtual cell identifier (ID); a sending module configured to send a PUCCH sequence over a PUCCH resource according to the virtual cell ID.

Preferably, the device further includes: a sequence obtaining module configured to obtain a cyclic shift root sequence of the PUCCH of the device according to the virtual cell ID.

According to another aspect of the disclosure, a physical uplink control channel (PUCCH) transmission system is provided, including: a base station and user equipment (UE), wherein the base station includes the above PUCCH resource configuration device; and the UE includes the above PUCCH information sending device.

By means of the technical solutions of the disclosure, when allocating PUCCH resources for a UE, dedicated PRBs are allocated to UEs configured to transmit uplink control information using an enhanced PUCCH, and orthogonal resources are allocated to UEs located in different cells among the above-mentioned UEs based on the dedicated PRBs, which solves the problem of great interference between PUCCHs from different cells and ensures the receiving quality of the PUCCH.

BRIEF DESCRIPTION OF THE DRAWINGS

Drawings, provided for further understanding of the disclosure and forming a part of the specification, are used to explain the disclosure as well as embodiments of the disclosure rather than to limit the disclosure. In the drawings:

FIG. 3 is a flowchart of a PUCCH resource configuration method according to an embodiment of the disclosure;

FIG. 4 is a schematic diagram of resource assignment according to an embodiment of the disclosure;

DETAILED DESCRIPTION OF THE PREFERRED EMBODIMENTS

Figure 1:
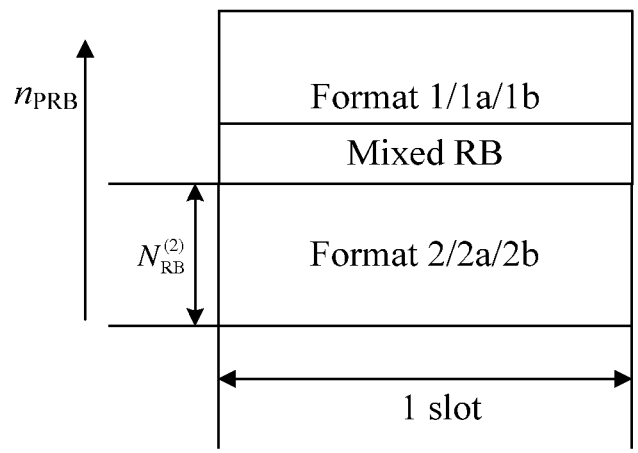
FIG. 1 is a schematic diagram showing the resource allocation of a PUCCH according to the related art.
Figure 2:
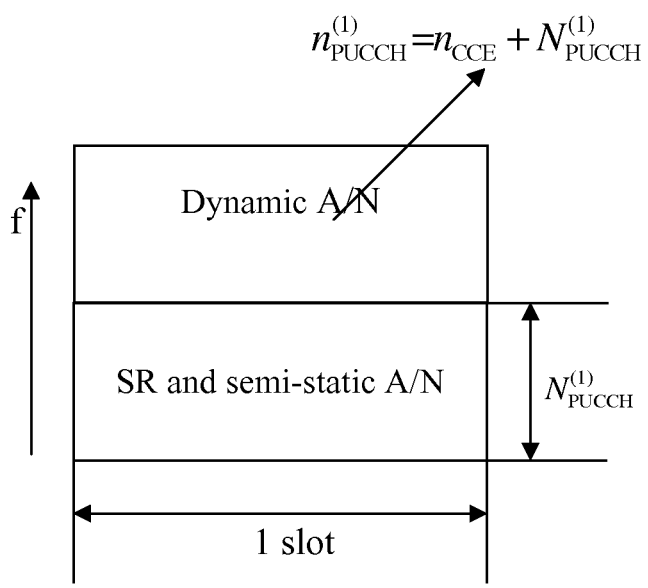
FIG. 2 is a schematic diagram showing the resource index configuration of a PUCCH according to the related art.

The disclosure is described below with reference to the accompanying drawings and embodiments in detail. Note that, the embodiments of the disclosure and the features of the embodiments can be combined with each other if there is no conflict.

In the embodiments of the disclosure, mainly with respect to the problem of great interference between PUCCHs from different cells, a PUCCH resource configuration method, transmission method, device and system are provided are provided. The method can be applied in the above-mentioned scenario 3, i.e., a heterogeneous network with low power RRHs within the macro cell coverage, wherein RRHs and the macro cell have different cell IDs. Of course, the PUCCH transmission method, device and system provided in the embodiments of the disclosure are applied in scenario 4 and homogeneous networks. This will be described in detail by way of embodiments.

A PUCCH resource configuration method is provided in the following embodiment, which method can be applied on a base station at the network side and can also be applied on other network-side devices. This embodiment is described by taking the implementation on a base station as an example. FIG. 3 is a flowchart of a PUCCH resource indication method, as shown in FIG. 3, the method includes the following steps (step S302-step S304).

Step S302, dedicated PRBs are allocated for UEs configured to transmit uplink control information using an enhanced PUCCH. Allocating the dedicated PRBs for the UEs configured to transmit the uplink control information using the enhanced PUCCH includes: taking the UEs configured to transmit the uplink control information using the enhanced PUCCH as a first type of UEs, and taking UEs other than the first type of UEs as a second type of UEs; and reserving a designated number of PRBs according to the number of UEs in the first type of UEs, wherein the designated number of PRBs are located between scheduling request (SR) as well as semi-static acknowledgement (ACK)/negative acknowledgement (NACK) resources of the second type of UEs, and dynamic ACK/NACK resources of the second type of UEs, and taking the designated number of PRBs as dedicated PRBs for the first type of UEs.

For example, when allocating PUCCH resources to UEs, the UEs can be divided into two types, a first type of UEs are UEs configured to transmit uplink control information using an enhanced PUCCH, including UEs which perform joint reception of the PUCCH, also including UEs which, in the case where the cell IDs of the macro base station and the RRH are different, access the macro base station and have a relatively large power which is comparable to or greater than the UE power of the RRH when reaching the RRH, thus causing interference to the UE of the RRH. The second type of UEs are UEs other than the first type of UEs, that is, the second type of UEs are UEs which do not need enhancement of PUCCH orthogonality. For a heterogeneous network corresponding to scenario 3 where the cell IDs of the RRHs and the macro cell are different, during implementation, PRBs different from the PRBs occupied by the second type of UEs are selected to serve as the dedicated PRBs.

Step S304, orthogonal resources are allocated to UEs located in different cells among the foregoing UEs (first type of UEs) based on the dedicated PRBs.

For example, network indication information may be delivered to the first type of UEs, wherein the resource indication information includes resource index information which indicates the first type of UEs to transmit a PUCCH on the dedicated PRBs, and sometimes includes a virtual cell ID.

By means of the above-mentioned method, when allocating PUCCH resources to a UE, dedicated PRBs are allocated to the above-mentioned UE configured to transmit uplink control information using an enhanced PUCCH and orthogonal resources are allocated to UEs located in different cells among the above-mentioned UEs based on the dedicated PRBs, which solves the problem of great interference between PUCCHs from different cells and ensures the receiving quality of the PUCCH.

Taking CoMP scenario 3 as an example, the first type of UEs can also be referred to as "R11 interfering UEs", for example, it refers to UEs which results in strong interference in CoMP scenario 3; and the second type of UEs can be referred to as ordinary UEs, which include UEs of R8/9/10 and UEs which do not result in strong interference in R11, that is, UEs other than the first type of UEs in CoMP scenario 3.

In the above-mentioned method, there can be two implementations when the base station allocates dedicated PRBs for the first type of UEs. The first implementation is: according to the number of UEs in the first type of UEs, a designated number of PRBs are reserved between SR as well as semi-static ACK/NACK (SR/semi-static ACK/NACK) resources of the second type of UEs, and dynamic ACK/NACK resources of the second type of UEs, and the designated number of PRBs are taken as the dedicated PRBs of the first type of UEs. FIG. 4 is a schematic diagram of resource assignment according to an embodiment of the disclosure. As shown in FIG. 4, the sloped line coverage area is the dedicated resources allocated to the first type of UEs. In FIG. 4, $N_P$ represents the number of physical PRBs occupied by the SR as well as semi-static ACK/NACK of the second type of UEs, $N_Q$ represents the number of PRBs occupied by the first type of UEs, which not only includes the resources required by SR as well as semi-static ACK/NACK but also includes the resources required by dynamic ACK/NACK. In the figure, the dashed lines represent that the SR/semi-static ACK/NACK resources and the dynamic ACK/NACK resources are distinguished by resource indices, which may occupy the same number of PRBs and may also occupy different number of PRBs. As such, the PRBs occupied by the first type of UEs and the second type of UEs can be distinguished, which offers conditions for reducing interference in the subsequent PUCCH transmission process.

Figure 5:
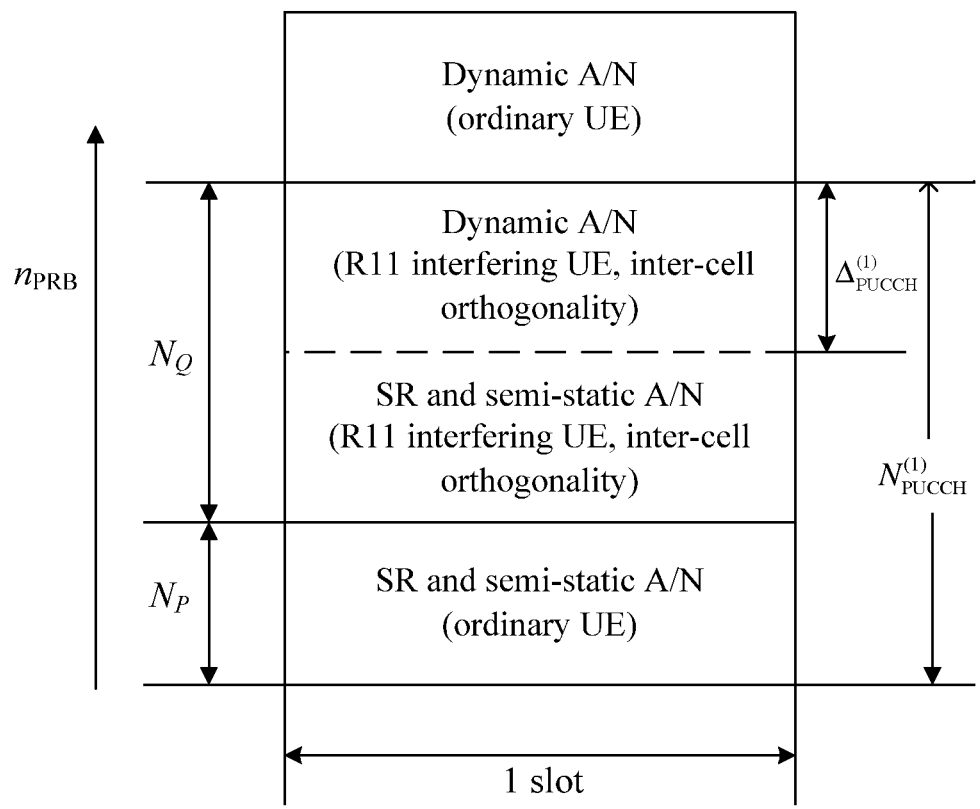
FIG. 5 is another schematic diagram of resource assignment according to an embodiment of the disclosure.

After the base station reserves a certain number of PRBs for the first type of UEs, the base station notifies the first type of UEs of the dedicated resources. In this embodiment, the following two solutions can be employed to notify the first type of UEs of the dedicated resources. In the first solution, the base station calculates the total number $N^{(1)}_{PUCCH}$ of reserved resource indices and a downward offset value $\Delta^{(1)}_{PUCCH}$ according to the access situations of the first type of UEs and the second type of UEs. FIG. 5 is another schematic diagram of resource assignment, wherein $\Delta^{(1)}_{PUCCH}$ represents the number of resource indices reserved for dynamic ACK/NACK in the dedicated PRBs, $N^{(1)}_{PUCCH}$ represents the total number of reserved resource indices, including the SR/semi-static ACK/NACK of the second type of UEs, the SR/semi-static ACK/NACK of the first type of UEs, and the dynamic ACK/NACK of the first type of UEs, that is, $N^{(1)}_{PUCCH}$ is equal to the total number of resource indices corresponding to $(N_P+N_Q)$ physical resource blocks. After calculating the above-mentioned two parameters $N^{(1)}_{PUCCH}$ and $\Delta^{(1)}_{PUCCH}$ the base station notifies all the UEs (including the first type of UEs and the second type of UEs) of the parameter $N^{(1)}_{PUCCH}$ via upper-layer signalling, and notifies the first type of UEs of $\Delta^{(1)}_{PUCCH}$.

After receiving the parameters $N^{(1)}_{PUCCH}$ and $\Delta^{(1)}_{PUCCH}$, the first type of UEs at the user side set the resources indices of dynamic ACK/NACK as the formula whereby the second type of UEs calculates the resource indices of dynamic ACK/NACK subtracting $\Delta^{(1)}_{PUCCH}$, wherein the calculation method of the dynamic ACK/NACK of the second type of UEs may employ the formula in R8/9/10. The first type of UEs determine the dedicated PRBs according to the calculate resource indices of the dynamic ACK/NACK, which calculation method is easy and feasible with a low development cost.

Figure 6:
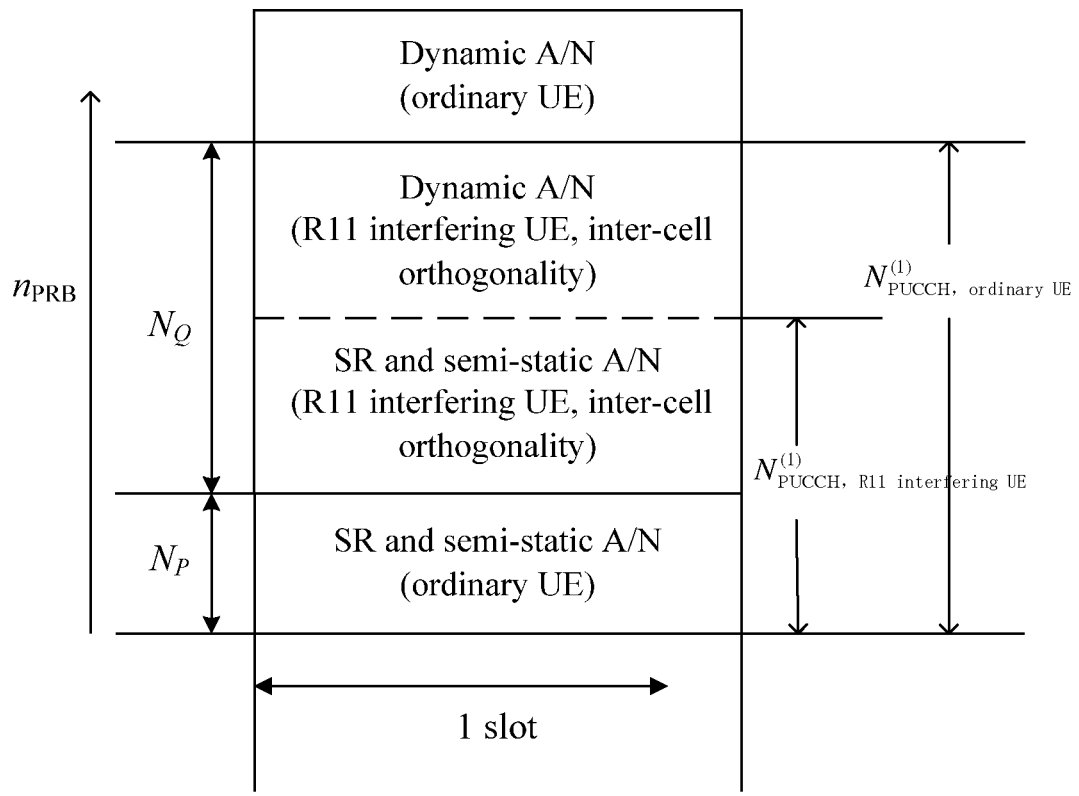
FIG. 6 is a third schematic diagram of resource assignment according to an embodiment of the disclosure.

The second implementation for the base station to notify the first type of UEs of the dedicated resources can be: the network side respectively notifies the first type of UEs and the second type of UEs of different starting positions of the dynamic ACK/NACK resources, the base station calculates the total number $N^{(1)}_{PUCCH,\ second\ type\ of\ UEs}$ (or referred to as $N^{(1)}_{PUCCH,\ ordinary\ UE}$) of reserved resource indices according to the access situations of the first type of UEs and the second type of UEs, and calculates the number $N^{(1)}_{PUCCH,\ first\ type\ of\ UEs}$ of resource indices (or referred to as $N^{(1)}_{PUCCH,\ R11\ interfering\ UE}$) of the SR/semi-static ACK/NACK reserved for the second type of UEs, then respectively notifies the first type of UEs and the second type of UEs of) $N^{(1)}_{PUCCH,\ first\ type\ of\ UEs}$ and $N^{(1)}_{PUCCH,\ second\ type\ of\ UEs}$ via upper-layer signalling. FIG. 6 is a third schematic diagram of resource assignment, where $N^{(1)}_{PUCCH,\ ordinary\ UE}$ represents the total number of reserved resource indices, including the SR/semi-static ACK/NACK of the second type of UEs, the SR/semi-static ACK/NACK of the first type of UEs and the dynamic ACK/NACK of the first type of UEs, that is, $N^{(1)}_{PUCCH,\ ordinary\ UE}$ is equal to the total number of resource indices corresponding to $(N_P+N_Q)$ physical resource blocks. $N^{(1)}_{PUCCH,\ R11\ interfering\ UE}$ represents the number of resource indices of the SR/semi-static ACK/NACK reserved for the second type of UEs and the first type of UEs. The base station notifies the second type of UEs of $N^{(1)}_{PUCCH,\ ordinary\ UE}$ via upper-layer signalling and notifies the first type of UEs of $N^{(1)}_{PUCCH,\ R11\ interfering\ UE}$.

After receiving $N^{(1)}_{PUCCH,\ first\ type\ of\ UEs}$ the first type of UEs at the user side obtain the resource indices of dynamic A/N according to $N^{(1)}_{PUCCH,\ first\ type\ of\ UEs}$ and a corresponding formula. After receiving $N^{(1)}_{PUCCH,\ second\ type\ of\ UEs}$, the second type of UEs obtain the resource indices of dynamic A/N according to $N^{(1)}_{PUCCH,\ second\ type\ of\ UEs}$, second type of UEs and a corresponding formula. For example, the calculation formulas of the resource indices of the dynamic ACK/NACK of the second type of UEs and the first type of UEs are the same as R8/9/10.

After allocating dedicated PRBs for the first type of UEs, the base station sets a virtual cell identifier (cell ID) for each UE of the first type of UEs.

When sending a PUCCH, the first type of UE obtains a cyclic shift root sequence using the virtual cell ID and then performs a channelization process according to this root sequence. There are four methods to set the virtual cell ID, any one of which can be employed. Method I is fixed virtual cell ID setting, that is, a fixed virtual cell ID value is set, and the network side and the UE both know this virtual cell ID value. Method II is a semi-static virtual cell ID setting, the network side notifies the first type of UEs of the virtual cell ID via upper-layer signalling. Method III is a semi-static and dynamic combined virtual cell ID setting, the network side indicates a plurality of available virtual cell IDs to the first type of UEs via upper-layer signalling, and indicates to Specifically use which one of them through a corresponding PUCCH. Method IV is a dynamic virtual cell ID setting, the network side notifies the first type of UEs of the virtual cell ID via a PDCCH.

The second method for allocating dedicated PRBs for the first type of UEs is: allocating resource indices for UEs (that is, the first type of UEs) configured to transmit uplink control information using an enhanced PUCCH, wherein the resource indices allocated to UEs which are located in different cells among the UEs configured to transmit uplink control information using the enhanced PUCCH correspond to different PRBs. That is, the PUCCHs of the first type of UEs located in different cells are allocated to different PRBs. The positions of these PRBs are unfixed, and when the base station allocates resources, it is merely required to ensure that these PRBs do not overlap other PUCCH/PUSCHs. The base station first allocates a designated number (such as 4) of resource values for each of the first type of UEs, notifies the UE of same via upper-layer signalling, and indicates to use which one of the designated number of resource values via two bits of the TPC domain of DCI format on a corresponding PDCCH, and the correlation between the bit values and the used resource value can be seen in Table 1. The resource index used by the first type of UEs is obtained according to the upper-layer signalling and Table 1. When two antenna ports are configured, each resource value corresponds to two PUCCH resources, wherein the first resource $n^{(1,p=p_0)}_{PUCCH}$ is used for antenna port $p_0$, and the second resource $n^{(1,p=p_1)}_{PUCCH}$ is used for antenna port $p_1$. In this method, dynamic ACK/NACK and semi-static ACK/NACK are not distinguished, and all the ACK/NACKs use the above-mentioned method to obtain resource indices.

The above-mentioned resource configuration method is described from the network side (such as base station), accordingly, in this embodiment, a PUCCH transmission method at the user side is also provided, which transmission method includes: a UE among the first type of UEs determines a resource index allocated to itself according to a network indication and a preconfigured resource determination manner, wherein the first type of UEs are UEs configured to transmit uplink control information using an enhanced PUCCH; and the first type of UEs transmit a PUCCH according to the determined resource index.

For the first configuration method for dedicated PRBs, if the network indication includes the total number $N^{(1)}_{PUCCH}$ of reserved resource indices and the downward offset value $\Delta^{(1)}_{PUCCH}$, accordingly, the UE among the first type of UEs determining a resource index allocated to itself according to the network indication and the preconfigured resource determination manner includes: after receiving the $N^{(1)}_{PUCCH}$ and $\Delta^{(1)}_{PUCCH}$, the UE among the first type of UEs sets the resource index of the dynamic ACK/NACK to be the formula whereby the second type of UEs calculate the resource index of the dynamic ACK/NACK subtracting $\Delta^{(1)}_{PUCCH}$, wherein the second type of UEs are UEs other than the first type of UEs.

For the second configuration method for dedicated PRBs, if the network indication includes the number $N^{(1)}_{PUCCH,\ first\ type\ of\ UEs}$ of reserved resource indices of the SR/semi-static ACK/NACK of the first type of UEs and the second type of UEs and the total number $N^{(1)}_{PUCCH,\ second\ type\ of\ UEs}$ of reserved resource indices, wherein the second type of UEs are UEs other than the first type of UEs; the UE among the first type of UEs determining a resource index allocated to itself according to the network indication and the preconfigured resource determination manner includes: after receiving the $N^{(1)}_{PUCCH,\ first\ type\ of\ UEs}$, the first type of UEs determines the starting position of the dynamic ACK/NACK area according to the $N^{(1)}_{PUCCH,\ first\ type\ of\ UEs}$; the method further includes: after the second type of UEs receives $N^{(1)}_{PUCCH,\ second\ type\ of\ UEs}$, the second type of UEs determines the starting position of the dynamic A/N area according to the $N^{(1)}_{PUCCH,\ second\ type\ of\ UEs}$.

When the first configuration method is used, the network indication also includes a virtual cell ID, and the method further includes: when transmitting a PUCCH, the UE among the first type of UEs obtains a cyclic shift root sequence according to the set virtual cell ID and performs channelization on the PUCCH according to the root sequence.

For the second configuration method, a UE among the first type of UEs determining the resource index allocated to itself according to the network indication and the preconfigured resource determination manner includes: the UE among the first type of UEs determines the current resource index according to upper-layer parameters and the corresponding PDCCH indication.

Figure 7:
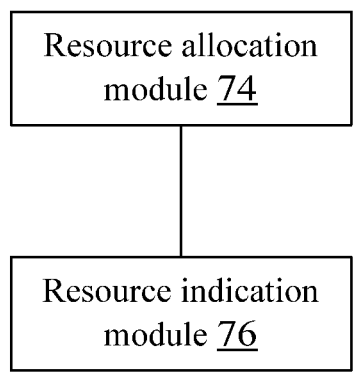
FIG. 7 is a structural block diagram of a PUCCH resource configuration device according to an embodiment of the disclosure.

Corresponding to the PUCCH resource configuration method, this embodiment also provides a PUCCH resource configuration device, which device is used for implementing the resource configuration method in the above-mentioned embodiment. FIG. 7 is a structural block diagram of a PUCCH resource configuration device according to an embodiment of the disclosure. As shown in FIG. 7, the device includes: a resource allocation module 74 and a resource indication module 76. The structure will be described in details below.

The resource allocation module 74 is configured to allocate dedicated PRBs for UEs configured to transmit uplink control information using an enhanced PUCCH, wherein the resource allocation module 74 is configured to allocate dedicated PRBs for UEs configured to transmit the uplink control information using the enhanced PUCCH in the following manner: taking UEs configured to transmit uplink control information using an enhanced PUCCH as a first type of UEs, and taking UEs other than the first type of UEs as a second type of UEs; and according the number of UEs in the first type of UEs, reserving a designated number of PRBs between scheduling request (SR)/semi-static acknowledgement (ACK)/negative acknowledgement (NACK) resources of the second type of UEs, and dynamic ACK/NACK resources, and taking the designated number of PRBs as dedicated PRBs for the first type of UEs;

wherein the UEs configured to transmit the uplink control information using the enhanced PUCCH are the above-mentioned first type of UEs;

the resource indication module 76 is coupled to the resource allocation module 74 and configured to allocate orthogonal resources for UEs located in different cells among the foregoing first type of UEs based on the dedicated PRBs allocated by the resource allocation module 74.

By means of the above-mentioned device, when allocating PUCCH resources for a UE, the resource allocation module 74 allocates dedicated PRBs for the first type of UEs and allocates orthogonal resources for UEs located in different cells among the foregoing first type of UEs through the resource indication module 76, which solves the problem of great interference between PUCCHs from different cells and ensuring the receiving quality of the PUCCH.

Figure 8:
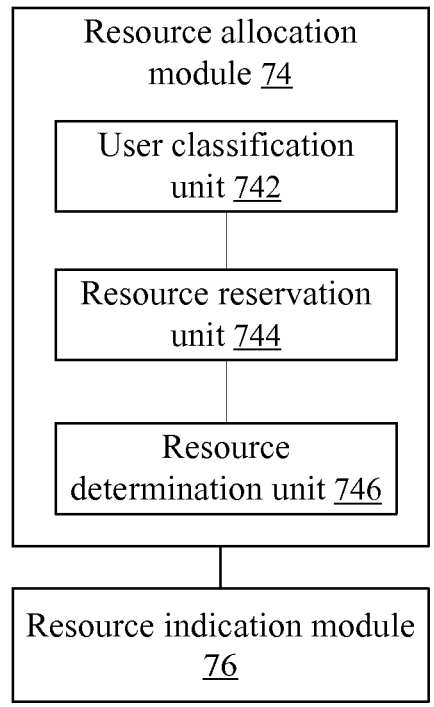
FIG. 8 is another structural block diagram of a PUCCH resource configuration device according to an embodiment of the disclosure.

The following method can be used to allocate dedicated PRBs for the first type of UEs. FIG. 8 is another structural schematic diagram of the PUCCH transmission device. As shown in FIG. 8, the device includes the modules in FIG. 7, and the resource allocation module 74 further includes a user classification unit 742, a resource reservation unit 744 and a resource determination unit 746. The structure will be described in details below.

The user classification unit 742 is configured to take UEs configured to transmit uplink control information using the enhanced PUCCH as a first type of UEs, and take UEs other than the first type of UEs as a second type of UEs;

the resource reservation unit 744 is coupled to the user classification unit 742 and configured to, according the number of UEs in the first type of UEs, reserve a designated number of PRBs between scheduling request (SR)/semi-static acknowledgement (ACK)/negative acknowledgement (NACK) resources of the second type of UEs and dynamic ACK/NACK resources of the second type of UEs, and take the designated number of PRBs as dedicated PRBs for the first type of UEs; and the resource determination unit 746 is coupled to the resource reservation unit 744 and configured to take the designated number of PRBs reserved by the resource reservation unit 744 as dedicated PRBs for the first type of UEs.

Figure 9:
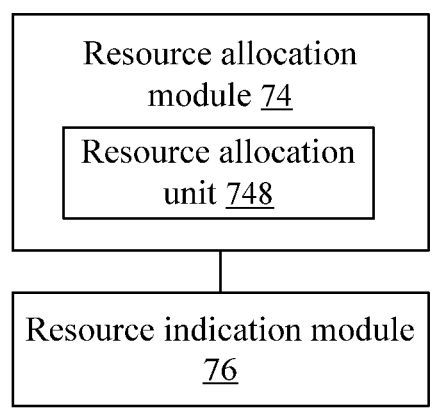
FIG. 9 is a third structural block diagram of a PUCCH resource configuration device according to an embodiment of the disclosure.

The following method can also be used to allocate dedicated PRBs for the first type of UEs. FIG. 9 is a third structural schematic diagram of the PUCCH transmission device, the device includes the modules in FIG. 7, the resource allocation module 74 further includes a resource allocation unit 748 configured to allocate resource indices for UEs configured to transmit the uplink control information using the enhanced PUCCH (the first type of UEs), wherein the resource indices allocated to UEs which are located in different cells among the UEs configured to transmit the uplink control information using the enhanced PUCCH correspond to different PRBs. The positions of these PRBs are unfixed, and when the base station allocates resources, it is merely required to ensure that these PRBs do not overlap other PUCCH/PUSCHs. The calculation method for the resource indices of ACK/NACK has been described in the foregoing, which will not be described here anymore.

Figure 10:
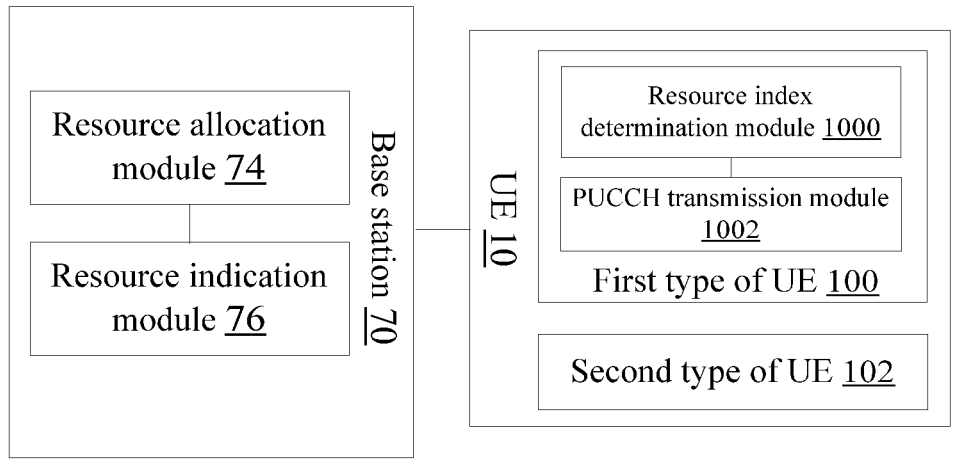
FIG. 10 is a structural block diagram of a PUCCH transmission system according to an embodiment of the disclosure.

Corresponding to the above-mentioned method and device, this embodiment also provides a PUCCH transmission system, which system is used for implementing the above-mentioned embodiment. FIG. 10 is a structural block diagram of a PUCCH transmission system according to an embodiment of the disclosure. As shown in FIG. 10, the system includes a base station 70 and a UE 10, wherein the base station 70 can be implemented using any one device corresponding to FIGS. 7 to 9, this embodiment is described taking the device implementation shown in FIG. 7 as an example, and this base station includes: a resource allocation module 74 and a resource indication module 76, the UE 10 is coupled to the base station 70, including a first type of UEs 100 and a second type of UEs 102, the first type of UEs including a resource index determination module 1000 and a PUCCH transmission module 1002. The structure will be described in details below.

The resource index determination module 1000 is configured to determine a resource index allocated to the UE according to a network indication and a preconfigured resource determination manner;

the PUCCH transmission module 1002 is configured to transmit a PUCCH according to the resource index determined by the resource index determination module 1000.

The functions of the remaining modules are the same as the above-mentioned description, which will not be described here. The particular PUCCH transmission process has been described in detail in the above-mentioned various embodiments, which will not be described here anymore.

Figure 11:
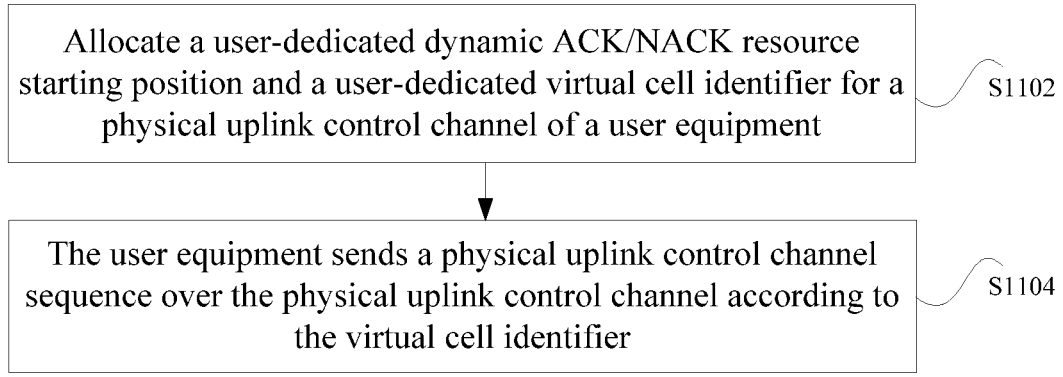
FIG. 11 is a flowchart of a physical uplink control channel resource configuration and transmission method according to an embodiment of the disclosure.

FIG. 11 is a flowchart of a physical uplink control channel resource configuration and transmission method according to an embodiment of the disclosure. As shown in FIG. 11, this flow includes the following steps (step S1102 to step S1104).

Step S1102, a user-dedicated dynamic acknowledgement (ACK)/negative acknowledgement (NACK) resource starting position and a user-dedicated virtual cell identifier are allocated for a physical uplink control channel of a user equipment; and step S1104, the user equipment sends a physical uplink control channel sequence over the physical uplink control channel resource according to the virtual cell identifier.

Preferably, the resource starting position corresponds to the physical resource block (PRB) in the above-mentioned embodiment.

A dynamic ACK/NACK resource index of the physical uplink control channel of the user equipment is obtained according to the user-dedicated dynamic ACK/NACK resource starting position and a lowest control channel element (CCE) index of the corresponding downlink control channel of the user.

Preferably, the user-dedicated dynamic ACK/NACK resource starting position includes: a designated number of physical resource blocks reserved for the user equipment via user-specific upper-layer signalling, wherein the designated number of physical resource blocks are located between scheduling request (SR) as well as semi-static ACK/NACK resources of the user equipment, and dynamic ACK/NACK resources of the user equipment.

Preferably, the designated number of physical resource blocks are obtained according to the total number $N^{(1)}_{PUCCH}$ of reserved resource indices of the SR as well as semi-static ACK/NACK resources of the PUCCH, and an offset value $\Delta^{(1)}_{PUCCH}$; where $N^{(1)}_{PUCCH}$ is an existing parameter in a standard, and $\Delta^{(1)}_{PUCCH}$ is notified to the user equipment via user-specific upper-layer signalling, or via physical layer signalling, or by designating one value via physical layer signalling from multiple values configured by upper-layer.

Preferably, the designated number of physical resource blocks are obtained according to the total number $N^{(1)}_{PUCCH,UE}$ of reserved resource indices of the SR as well as semi-static ACK/NACK resources of the PUCCH; where $N^{(1)}_{PUCCH,UE}$ is notified to the user equipment via user-specific upper-layer signalling, or via physical layer signalling, or by designating one value via physical layer signalling from a plurality of values configured by upper-layer.

Preferably, the user equipment obtains a cyclic shift root sequence of the physical uplink control channel thereof according to the virtual cell identifier.

Preferably, the virtual cell identifier is obtained in one of the following manners: setting a fixed virtual cell ID, and configuring the virtual cell ID to the user equipment; selecting a virtual cell ID, and notifying the user equipment of the virtual cell ID via upper-layer signalling; indicating a plurality of virtual cell IDs to the user equipment via upper-layer signalling, and indicating a currently used cell ID via physical downlink control signalling; and notifying the user equipment of a virtual cell ID via physical downlink control signalling.

Figure 12:
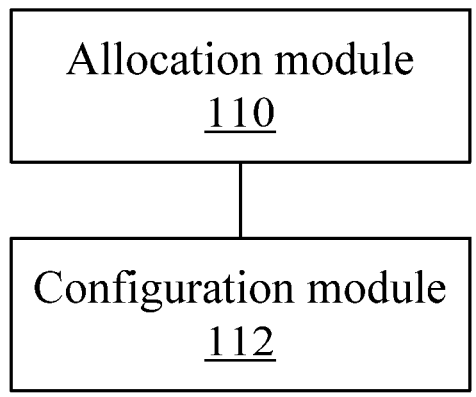
FIG. 12 is a structural block diagram of a physical uplink control channel resource configuration device according to an embodiment of the disclosure.

Corresponding to the physical uplink control channel resource configuration and transmission method introduced in the above-mentioned embodiment, this embodiment also provides a physical uplink control channel resource configuration device, which device is usually provided at the base station side. FIG. 12 is a structural block diagram of a PUCCH resource configuration device according to an embodiment of the disclosure. As shown in FIG. 12, the device includes: an allocation module 110 and an indication module 112. The structure will be described in details below.

The allocation module 110 is configured to allocate a user-dedicated dynamic acknowledgement (ACK)/negative acknowledgement (NACK) resource starting position and a user-dedicated virtual cell identifier for a physical uplink control channel of a user equipment; and the configuration module 112 is coupled to the allocation module 110 and configured to configure the virtual cell identifier to the user equipment.

Preferably, the resource starting position corresponds to the physical resource block (PRB) in the above-mentioned embodiment.

The configuration module includes: a first configuration unit configured to set a fixed virtual cell ID, and configure the virtual cell ID to the user equipment; or, a second configuration unit configured to select a virtual cell ID, and notify the user equipment of the virtual cell ID via upper-layer signalling; or, a third configuration unit configured to indicate a plurality of virtual cell IDs to the user equipment via upper-layer signalling, and indicate a currently used cell ID via physical downlink control signalling; or, a fourth configuration unit configured to notify the user equipment of a virtual cell ID via physical downlink control signalling.

Figure 13:
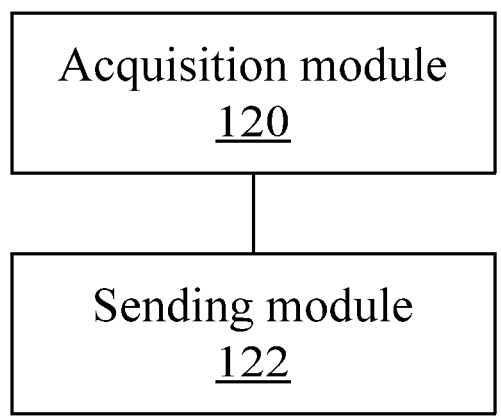
FIG. 13 is a structural block diagram of a physical uplink control channel information sending device according to an embodiment of the disclosure.

Corresponding to the physical uplink control channel resource configuration and transmission method introduced in the above-mentioned embodiment, this embodiment also provides a physical uplink control channel information sending device, which device is usually provided at the user equipment side. FIG. 13 is a structural block diagram of a PUCCH resource configuration device according to an embodiment of the disclosure. As shown in FIG. 13, the device includes: an allocation module 110 and a configuration module 112. The structure will be described in details below.

The acquisition module 120 is configured to acquire a user-dedicated virtual cell identifier;

the sending module 122 is coupled to the acquisition module 120 and configured to send a physical uplink control channel sequence over a physical uplink control channel according to the virtual cell identifier.

Preferably, the device further includes: a sequence obtaining module configured to obtain a cyclic shift root sequence of the physical uplink control channel of the user equipment according to the virtual cell identifier.

Figure 14:
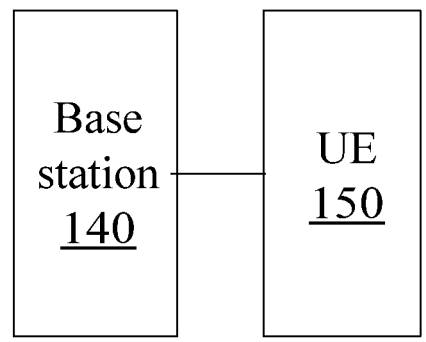
FIG. 14 is a structural block diagram of a physical uplink control channel transmission system according to an embodiment of the disclosure.

Corresponding to the physical uplink control channel resource configuration device and physical uplink control channel information sending device introduced in the above-mentioned embodiments, this embodiment also provides a physical uplink control channel information (PUCCH) transmission system. FIG. 14 is a structural block diagram of a physical uplink control channel transmission system according to an embodiment of the disclosure. As shown in FIG. 14, the system includes: a base station 140 and a user equipment (UE) 150, wherein the base station 140 includes a physical uplink control channel resource configuration device introduced in the above-mentioned embodiment, and the UE 150 includes a physical uplink control channel information sending device introduced in the above-mentioned embodiment.

In the above-mentioned embodiment, preferably, a dynamic ACK/NACK resource index of the physical uplink control channel of the user equipment is obtained according to the user-dedicated dynamic ACK/NACK resource starting position and a lowest control channel element (CCE) index of the corresponding downlink control channel of the user.

Preferably, the user-dedicated dynamic ACK/NACK resource starting position includes: a designated number of physical resource blocks reserved for the user equipment via user-specific upper-layer signalling, wherein the designated number of physical resource blocks are located between scheduling request (SR) as well as semi-static ACK/NACK resources of the user equipment, and dynamic ACK/NACK resources of the user equipment.

Preferably, the designated number of physical resource blocks are obtained according to the total number $N^{(1)}_{PUCCH}$ of reserved resource indices of the SR as well as semi-static ACK/NACK resources of the PUCCH, and an offset value $\Delta^{(1)}_{PUCCH}$ where $N^{(1)}_{PUCCH}$ is an existing parameter in a standard, and $\Delta^{(1)}_{PUCCH}$ is notified to the user equipment via user-specific upper-layer signalling, or via physical layer signalling, or by designating one value via physical layer signalling from multiple values configured by upper-layer.

Preferably, the designated number of physical resource blocks are obtained according to the total number $N^{(1)}_{PUCCH,UE}$ of reserved resource indices of the SR as well as semi-static ACK/NACK resources of the PUCCH; where $N^{(1)}_{PUCCH,UE}$ is notified to the user equipment via user-specific upper-layer signalling, or via physical layer signalling, or by designating one value via physical layer signalling from a plurality of values configured by upper-layer.

In order to enable the objectives, technical solutions and advantages of the disclosure to be clearer, the implementation process of the above-mentioned embodiments will be described in detail in combination with preferred embodiments and figures. The disclosure can be applied to a base station at the network side and can also be applied to other network-side devices. The following embodiments will describe this by taking the implementation on a base station as an example.

Embodiment 1

This embodiment is described with respect to an FDD system, wherein the base station employs the first method to allocate dedicated PRBs for the first type of UEs, employs the first solution to notify the first type of UEs of the dedicated resources, and employs the first method to set a virtual cell ID.

Specifically, on the premise of ensuring that R11 interfering UEs and ordinary UEs occupy different physical resource blocks, the base station calculates the total number of resource indices $N^{(1)}_{PUCCH}$ reserved for the SR/semi-static ACK/NACK of the ordinary UEs and the SR/semi-static ACK/NACK and the dynamic ACK/NACK of the R11 interfering UEs, the number $\Delta^{(1)}_{PUCCH}$ of resource indices reserved for the dynamic ACK/NACK of the R11 interfering UEs, and the resource indices $n^{(1,p)}_{PUCCH}$ of the SR/semi-static ACK/NACK of all the UEs.

The base station notifies corresponding UEs of the resource indices of SR/semi-static ACK/NACK via upper layer signalling, notifies all the UEs of $N^{(1)}_{PUCCH}$, and notifies R11 interfering UEs of $\Delta^{(1)}_{PUCCH}$. After receiving the upper-layer signalling notification, the UE obtains the resource indices according to the following rules:

the resource index of the SR is obtained according to upper-layer configuration;

in an FDD system, when only one serving cell is configured for a UE, the method for obtaining the resource index $n^{(1,p)}_{PUCCH}$ of PUCCH format 1a/1b on subframe n is described as follows.

The first method: if the PDSCH on subframe n-4 of the main serving cell does not detect a corresponding PUCCH, then $n^{(1,p)}_{PUCCH}$ is obtained according to upper-layer configuration and Table 1. When the UE is configured with two antenna ports, each PUCCH resource value in the table corresponds to two resource indices, wherein the first one is used for antenna port p0 and the second one is used for antenna port p1.

The second method: if the PDSCH on subframe n-4 of the main serving cell detects a corresponding PDCCH or the PDCCH is used for indicating downlink SPS release, then $n^{(1,p)}_{PUCCH}$ is obtained according to the following formulae. With respect to an ordinary UE, for the first antenna port: $n^{(1,p=p0)}_{PUCCH}=n_{CCE}+N^{(1)}_{PUCCH}$ where $n_{CCE}$ represents the first CCE index of the corresponding PDCCH; and for the second antenna port: $n^{(1,p=p1)}_{PUCCH}=n_{CCE}+1+N^{(1)}_{PUCCH}$. With respect to an R11 interfering UE, for the first antenna port: $n^{(1,p=p0)}_{PUCCH}=n_{CCE}+N^{(1)}_{PUCCH}-\Delta^{(1)}_{PUCCH}$; and for the second antenna port: $n^{(1,p=p0)}_{PUCCH}=n_{CCE}+1+N^{(1)}_{PUCCH}-\Delta^{(1)}_{PUCCH}$.

After the resource index of the R11 interfering UE is calculated, a fixed virtual cell ID allocation method will be employed, in which method, the network-side base station and the R11 interfering UE both know this virtual cell ID.

The ordinary UE obtains a cyclic shift root sequence according to its own cell ID, and the R11 interfering UE obtains a cyclic shift root sequence according to the virtual cell ID. All the UEs calculate the resource sequence number of the cyclic shift root sequence, the resource sequence number of the orthogonal code and the resource sequence number of the physical resource block according to the obtained resource index $n^{(1)}_{PUCCH}$. Then a channelization process is performed, and the channelization result is mapped to the corresponding time frequency resource.

Embodiment 2

This embodiment is described with respect to an FDD system, wherein the base station employs the first method to allocate dedicated PRBs for the first type of UEs, employs the first solution to notify the first type of UEs of the dedicated resources, and employs the second method to set a virtual cell ID.

Specifically, on the premise of ensuring that R11 interfering UEs and ordinary UEs occupy different physical resource blocks, the base station calculates the total number of resource indices $N^{(1)}_{PUCCH}$ reserved for the SR/semi-static ACK/NACK of the ordinary UEs and the SR/semi-static ACK/NACK and the dynamic ACK/NACK of the R11 interfering UEs, the number $\Delta^{(1)}_{PUCCH}$ of resource indices reserved for the dynamic ACK/NACK of the R11 interfering UEs, and the resource indices $n^{(1,p)}_{PUCCH}$ of the SR/semi-static ACK/NACK of all the UEs.

The base station notifies corresponding UEs of the resource indices of SR/semi-static ACK/NACK via upper layer signalling, notifies all the UEs of $N^{(1)}_{PUCCH}$ and notifies R11 interfering UEs of $\Delta^{(1)}_{PUCCH}$.

After receiving the upper-layer signalling notification, the UE obtains the resource indices according to the following rules:

the resource index of the SR is obtained according to upper-layer configuration;

in an FDD system, when only one serving cell is configured for a UE, the method for obtaining the resource index $n^{(1,p)}_{PUCCH}$ of PUCCH format 1a/1b on subframe n is described as follows.

The first method: if the PDSCH on subframe n-4 of the main serving cell does not detect a corresponding PUCCH, then $n^{(1,p)}_{PUCCH}$ is obtained according to upper-layer configuration and Table 1. When the UE is configured with two antenna ports, each PUCCH resource value in the table corresponds to two resource indices, the first one is used for antenna port p0 and the second one is used for antenna port p1.

The second method: if the PDSCH on subframe n-4 of the main serving cell detects a corresponding PDCCH or the PDCCH is used for indicating downlink SPS release, then $n^{(1,p)}_{PUCCH}$ is obtained according to the following formulae. With respect to an ordinary UE, for the first antenna port: $n^{(1,p=p_0)}_{PUCCH} = n_{CCE} + N^{(1)}_{PUCCH}$, where $n_{CCE}$ represents the first CCE index of the corresponding PDCCH; and for the second antenna port: $n^{(1,p=p_1)}_{PUCCH} = n_{CCE} + 1 + N^{(1)}_{PUCCH}$. With respect to an R11 interfering UE, for the first antenna port: $n^{(1,p=p_0)}_{PUCCH} = n_{CCE} + N^{(1)}_{PUCCH} - \Delta^{(1)}_{PUCCH}$; and for the second antenna port: $n^{(1,p=p_0)}_{PUCCH} = n_{CCE} + 1 + N^{(1)}_{PUCCH} - \Delta^{(1)}_{PUCCH}$.

The network-side base station selects a virtual cell ID, and notifies the R11 interfering UE of the virtual cell ID via upper-layer signalling.

The ordinary UE obtains a cyclic shift root sequence according to its own cell ID, and the R11 interfering UE obtains a cyclic shift root sequence according to the virtual cell ID. All the UEs calculate the resource sequence number of the cyclic shift root sequence, the resource sequence number of the orthogonal code and the resource sequence number of the physical resource block according to the obtained resource index $n^{(1)}_{PUCCH}$. Then a channelization process is performed, and the channelization result is mapped to the corresponding time frequency resource.

Embodiment 3

This embodiment is described with respect to an FDD system, wherein the base station employs the first method to allocate dedicated PRBs for the first type of UEs, employs the first solution to notify the first type of UEs of the dedicated resources, and employs the third method to set a virtual cell ID.

Specifically, on the premise of ensuring that R11 interfering UEs and ordinary UEs occupy different physical resource blocks, the base station calculates the total number of resource indices $N^{(1)}_{PUCCH}$ reserved for the SR/semi-static ACK/NACK of the ordinary UEs and the SR/semi-static ACK/NACK and the dynamic ACK/NACK of the R11 interfering UEs, the number $N^{(1)}_{PUCCH}$ of resource indices reserved for the dynamic ACK/NACK of the R11 interfering UEs, and the resource indices $n^{(1,p)}_{PUCCH}$ of the SR/semi-static ACK/NACK of all the UEs.

The base station notifies corresponding UEs of the resource indices of SR/semi-static ACK/NACK via upper layer signalling, notifies all the UEs of $N^{(1)}_{PUCCH}$ and notifies R11 interfering UEs of $\Delta^{(1)}_{PUCCH}$.

After receiving the upper-layer signalling notification, the UE obtains the resource indices according to the following rules:

the resource index of the SR is obtained according to upper-layer configuration;

in an FDD system, when only one serving cell is configured for a UE, the method for obtaining the resource index $n^{(1,p)}_{PUCCH}$ of PUCCH format 1a/1b on subframe n is described as follows.

The first method: if the PDSCH on subframe n-4 of the main serving cell does not detect a corresponding PUCCH, then $n^{(1,p)}_{PUCCH}$ is obtained according to upper-layer configuration and Table 1. When the UE is configured with two antenna ports, each PUCCH resource value in the table corresponds to two resource indices, wherein the first one is used for antenna port p0 and the second one is used for antenna port p1.

The second method: if the PDSCH on subframe n-4 of the main serving cell detects a corresponding PDCCH or the PDCCH is used for indicating downlink SPS release, then $n^{(1,p)}_{PUCCH}$ is obtained according to the following formulae. With respect to an ordinary UE, for the first antenna port: $n^{(1,p=p_0)}_{PUCCH} = n_{CCE} + N^{(1)}_{PUCCH}$, where $n_{CCE}$ represents the first CCE index of the corresponding PDCCH; and for the second antenna port: $n^{(1,p=p_1)}_{PUCCH} = n_{CCE} + 1 + N^{(1)}_{PUCCH}$. With respect to an R11 interfering UE, for the first antenna port: $n^{(1,p=p_0)}_{PUCCH} = n_{CCE} + N^{(1)}_{PUCCH} - \Delta^{(1)}_{PUCCH}$; and for the second antenna port: $n^{(1,p=p_0)}_{PUCCH} = n_{CCE} + 1 + N^{(1)}_{PUCCH} - \Delta^{(1)}_{PUCCH}$.

The network-side base station indicates a plurality of available virtual cell IDs to the R11 interfering UE via upper-layer signalling, and indicates which virtual cell ID in particular shall be employed to the R11 interfering UE via a PDCCH.

The R11 interfering UE obtains a virtual cell ID according to upper-layer signalling and the PDCCH and obtains a cyclic shift root sequence according to the virtual cell ID. An ordinary UE obtains a cyclic shift root sequence according to its own cell ID. All the UEs calculate the resource sequence number of the cyclic shift root sequence, the resource sequence number of the orthogonal code and the resource sequence number of the physical resource block according to the obtained resource index $n^{(1)}_{PUCCH}$. Then a channelization process is performed, and the channelization result is mapped to the corresponding time frequency resource.

Embodiment 4

This embodiment is described with respect to an FDD system, wherein the base station employs the first method to allocate dedicated PRBs for the first type of UEs, employs the first solution to notify the first type of UEs of the dedicated resources, and employs the fourth method to set a virtual cell ID.

Specifically, on the premise of ensuring that R11 interfering UEs and ordinary UEs occupy different physical resource blocks, the base station calculates the total number of resource indices $N^{(1)}_{PUCCH}$ reserved for the SR/semi-static ACK/NACK of the ordinary UEs and the SR/semi-static ACK/NACK and the dynamic ACK/NACK of the R11 interfering UEs, the number $\Delta^{(1)}_{PUCCH}$ of resource indices reserved for the dynamic ACK/NACK of the R11 interfering UEs, and the resource indices $n^{(1,p)}{}_{PUCCH}$ of the SR/semi-static ACK/NACK of all the UEs.

The base station notifies corresponding UEs of the resource indices of SR/semi-static ACK/NACK via upper layer signalling, notifies all the UEs of $N^{(1,p)}{}_{PUCCH}$ and notifies R11 interfering UEs of $\Delta^{(1)}{}_{PUCCH}$.

After receiving the upper-layer signalling notification, the UE obtains the resource indices according to the following rules:

the resource index of the SR is obtained according to upper-layer configuration;

in an FDD system, when only one serving cell is configured for a UE, the method for obtaining the resource index $n^{(1,p)}{}_{PUCCH}$ of PUCCH format 1a/1b on subframe n is described as follows.

The first method: if the PDSCH on subframe n-4 of the main serving cell does not detect a corresponding PUCCH, then $n^{(1,p)}{}_{PUCCH}$ is obtained according to upper-layer configuration and Table 1. When the UE is configured with two antenna ports, each PUCCH resource value in the table corresponds to two resource indices, wherein the first one is used for antenna port p0 and the second one is used for antenna port p1.

The second method: if the PDSCH on subframe n-4 of the main serving cell detects a corresponding PDCCH or the PDCCH is used for indicating downlink SPS release, then $n^{(1,p)}{}_{PUCCH}$ is obtained according to the following formulae. With respect to an ordinary UE, for the first antenna port: $n^{(1,p=p_0)}{}_{PUCCH} = n_{CCE} + N^{(1)}{}_{PUCCH}$, where $n_{CCE}$ represents the first CCE index of the corresponding PDCCH; and for the second antenna port: $n^{(1,p=p_1)}{}_{PUCCH} = n_{CCE} + 1 + N^{(1)}{}_{PUCCH}$. With respect to an R11 interfering UE, for the first antenna port: $n^{(1,p=p_0)}{}_{PUCCH} = n_{CCE} + N^{(1)}{}_{PUCCH} - \Delta^{(1)}{}_{PUCCH}$; and for the second antenna port: $n^{(1,p=p_0)}{}_{PUCCH} = n_{CCE} 1 + N^{(1)}{}_{PUCCH} - \Delta^{(1)}{}_{PUCCH}$.

The network-side base station notifies the UE of the virtual cell ID through a PDCCH.

The ordinary UE obtains a cyclic shift root sequence according to its own cell ID, and the R11 interfering UE obtains a cyclic shift root sequence according to the virtual cell ID. All the UEs calculate the resource sequence number of the cyclic shift root sequence, the resource sequence number of the orthogonal code and the resource sequence number of the physical resource block according to the obtained resource index $n^{(1)}{}_{PUCCH}$. Then a channelization process is performed, and the channelization result is mapped to the corresponding time frequency resource.

Embodiment 5

This embodiment is described with respect to an FDD system, wherein the base station employs the first method to allocate dedicated PRBs for the first type of UEs, employs the second solution to notify the first type of UEs of the dedicated resources, and employs the first method to set a virtual cell ID.

Specifically, on the premise of ensuring that R11 interfering UEs and ordinary UEs occupy different physical resource blocks, the base station calculates the total number $N^{(1)}{}_{PUCCH, ordinary\ UE}$, of resource indices reserved for the SR/semi-static ACK/NACK of the ordinary UEs and the SR/semi-static ACK/NACK and the dynamic ACK/NACK of the R11 interfering UEs, the number $N^{(1)}{}_{PUCCH,R11\ interfering\ UE}$ of resource indices reserved for the SR/semi-static ACK/NACK of the ordinary UEs and R11 interfering UEs, and the resource indices $n^{(1,p)}{}_{PUCCH}$ of the SR/semi-static ACK/NACK of all the UEs.

The base station notifies corresponding UEs of the resource indices of SR/semi-static ACK/NACK via upper-layer signalling, notifies all the UEs of $N^{(1)}{}_{PUCCH, ordinary\ UE}$ and notifies R11 interfering UEs of $N^{(1)}{}_{PUCCH,R11\ interfering\ UE}$.

After receiving the upper-layer signalling notification, the UE obtains the resource indices according to the following rules:

the resource index of the SR is obtained according to upper-layer configuration;

in an FDD system, when only one serving cell is configured for a UE, the method for obtaining the resource index $n^{(1,p)}{}_{PUCCH}$ of PUCCH format 1a/1b on subframe n is described as follows.

The first method: if the PDSCH on subframe n-4 of the main serving cell does not detect a corresponding PUCCH, then $n^{(1,p)}{}_{PUCCH}$ is obtained according to upper-layer configuration and Table 1. When the UE is configured with two antenna ports, each PUCCH resource value in the table corresponds to two resource indices, wherein the first one is used for antenna port p0 and the second one is used for antenna port p1.

The second method: if the PDSCH of subframe n-4 of the main serving cell detects a corresponding PDCCH or the PDCCH is used for indicating downlink SPS release, then $n^{(1,p)}{}_{PUCCH}$, is obtained according to the following formulae. For the first antenna port: $n^{(1,p=p_0)}{}_{PUCCH} = n_{CCE} + N^{(1)}{}_{PUCCH}$, where $n_{CCE}$ represents the first CCE index of the corresponding PDCCH; for the second antenna port: $n^{(1,p=p_1)}{}_{PUCCH} = n_{CCE} + 1 + N^{(1)}{}_{PUCCH}$.

A fixed virtual cell ID allocation method is employed, in which method, the network-side base station and the R11 interfering UE both know this virtual cell ID in advance.

The ordinary UE obtains a cyclic shift root sequence according to its own cell ID, and the R11 interfering UE obtains a cyclic shift root sequence according to the virtual cell ID. All the UEs calculate the resource sequence number of the cyclic shift root sequence, the resource sequence number of the orthogonal code and the resource sequence number of the physical resource block according to the obtained resource index $n^{(1)}{}_{PUCCH}$. Then a channelization process is performed, and the channelization result is mapped to the corresponding time frequency resource.

Embodiment 6

This embodiment is described with respect to an FDD system, wherein the base station employs the first method to allocate dedicated PRBs for the first type of UEs, employs the first solution to notify the first type of UEs of the dedicated resources, and employs the first method to set a virtual cell ID. Specifically, on the premise of ensuring that R11 interfering UEs and ordinary UEs occupy different physical resource blocks, the base station calculates the total number of resource indices $N^{(1)}{}_{PUCCH}$ reserved for the SR/semi-static ACK/NACK of the ordinary UEs and the SR/semi-static ACK/NACK and the dynamic ACK/NACK of the R11 interfering UEs, the number $\Delta^{(1)}{}_{PUCCH}$ of resource indices reserved for the dynamic ACK/NACK of the R11 interfering UEs, and the resource indices $n^{(1,p)}{}_{PUCCH}$ of the SR/semi-static ACK/NACK of all the UEs.

The base station notifies corresponding UEs of the resource indices of SR/semi-static ACK/NACK via upper-layer signalling, notifies all the UEs of $n^{(1,p)}{}_{PUCCH}$ and notifies R11 interfering UEs of $\Delta^{(1)}{}_{PUCCH}$.

After receiving the upper-layer signalling notification, the UE obtains the resource indices according to the following rules.

The resource index of the SR is obtained according to upper-layer configuration.

In a TDD system, when only one serving cell is configured for a UE, TDD HARQ-ACK multiplexing mode is employed and M=1, wherein M represents the number of downlink subframes which need to feed back ACK/NACK on an uplink subframe n; or when using the TDD HARQ-ACK bundling mode, the obtaining method of the resource index on the subframe n is as follows. The first method: if there is at least one PDSCH, which has a corresponding PDCCH, in M downlink subframes corresponding to the uplink subframe n, or there is a PDCCH for indicating downlink SPS release in one of the subframes, for an ordinary UE, the calculation formula for the first antenna port is $n^{(1,\tilde{p}=p_0)}_{PUCCH}=M-m-1)\cdot N_c+m\cdot N_{c+1}+n_{CCE}+N^{(1)}_{PUCCH}$, where $n_{CCE}$ is the sequence number of the first CCE occupied by the last corresponding PDCCH received on M downlink subframes, m is the sequence number of the downlink subframe where the last received PDSCH is located in the M downlink subframes corresponding to the uplink subframe n, and 0≤m≤M−1, n represents the subframe number where the current ACK/NACK is located, $N_c$ is the number of CCEs contained in the first c symbols of one subframe, and the choice of c∈{0, 1, 2, 3} shall ensure $N_c \leq n_{CCE} < N_{c+1}$, and $N_c=\max\{\lfloor[N_{RB}^{DL}\cdot(N_{sc}^{RB}\cdot c-4)]/36\rfloor\}$, where $N_{RB}^{DL}$ represents the number of RBs corresponding to downlink bandwidth, $N_{sc}^{RB}$ represents the number of subcarriers in one RB; and the calculation formula for the second antenna port is $n^{(1,\tilde{p}=p_1)}_{PUCCH=(M-m-1)}\cdot N_c+m\cdot N_{c+1}+n_{CCE}+1+N^{(1)}_{PUCCH}$, and the choice of c∈{0, 1, 2, 3} shall ensure $N_c \leq n_{CCE}+1<N_{c+1}$.

For an R11 interfering UE, the calculation formula for the first antenna port is $n^{(1,\tilde{p}=p_0)}_{PUCCH=(M-m-1)}\cdot N_c+m\cdot N_{c+1}+n_{CCE}+N^{(1)}_{PUCCH}-\Delta^{(1)}_{PUCCH}$, and the calculation formula for the second antenna port is $n^{(1,\tilde{p}=p_1)}_{PUCCH=(M-m-1)}\cdot N_c+m\cdot N_{c+1}+n_{CCE}+1+N^{(1)}_{PUCCH}-\Delta^{(1)}_{PUCCH}$, and the choice of c∈{0, 1, 2, 3} shall ensure $N_c \leq n_{CCE}+1<N_{c+1}$.

ACK/NACK multiplexing refers to that there are Q downlink subframes, which have the PDSCH of a certain UE, in the M downlink subframes corresponding to the uplink subframe n, each downlink subframe only generates 1 bit ACK/NACK feedback information, wherein in the case of a single codeword stream, the ACK/NACK of this codeword is the feedback information of this downlink subframe, and in the case of two codeword streams, "logic AND" is performed on the ACK/NACK of these two codewords, thus obtaining the feedback information of this downlink subframe.

The ACK/NACK bundling refers to that there are Q downlink subframes, which have the PDSCH of a certain UE, in the M downlink subframes corresponding to the uplink subframe n, then for a certain codeword, "logic AND" is performed on the ACK/NACK of these PDSCHs, thus obtaining the bundling ACK/NACK (1 bit) of this codeword.

The second method: if there is no PDSCH, which has a corresponding PDCCH, in the M downlink subframes corresponding to the uplink subframe n, then $n^{(1,\tilde{p})}_{PUCCH}$ will be obtained according to upper-layer configuration and Table 1. When the UE configures two antenna ports, each PUCCH resource value in the table correspond to two resource indices, wherein the first one is used for antenna port p0 and the second one is used for antenna port p1.

In a TDD system, when only one serving cell is configured for a UE, and the TDD HARQ-ACK multiplexing mode is employed and M>1, it is required to feed back the ACK/NACK of M subframes on subframe n, and the $i^{th}$ resource index $n^{(1)}_{PUCCH,i}$ 0≤i<M−1 can be obtained by one or the following methods.

The first method: if there is at least one PDSCH, which has a corresponding PDCCH, in the M downlink subframes corresponding to the uplink subframe n, or there is a PDCCH for indicating downlink SPS release in one of the M subframes:

for an ordinary UE, the calculation formula is $n^{(1)}_{PUCCH,i}=(M-i-1)\cdot N_c+i\cdot N_{c+1}+n_{CCE,i}+N^{(1)}_{PUCCH}$, where $n_{CCE,i}$ is the sequence number of the first CCE occupied by a corresponding PDCCH, $N_c$ is the number of CCEs contained in the first c symbols of one subframe, and the choice of c∈{0, 1, 2, 3} shall ensure $N_c \leq n_{CCE,i} < N_{c+1}$, and $N_c=\max\{0,\lfloor[N_{RB}^{DL}\cdot[N_{sc}^{RB}\cdot c-4)]/36\rfloor\}$.

For an R11 CoMP UE, the calculation formula for the $i^{th}$ resource index $n^{(1)}_{PUCCH,i}$ is $n^{(1)}_{PUCCH}=(M-i-1)\cdot N_c+i\cdot N_{c+1}+n_{CCE,i}+N^{(1)}_{PUCCH}-\Delta^{(1)}_{PUCCH}$.

The second method: if there is no PDSCH, which has a corresponding PDCCH, in the M downlink subframes corresponding to the uplink subframe n, then $n^{(1,\tilde{p})}_{PUCCH}$ will be obtained according to upper-layer configuration and Table 1.

A fixed virtual cell ID allocation method is employed by the base station, in which method, the network-side base station and the R11 interfering UE both know this virtual cell ID in advance.

The ordinary UE obtains a cyclic shift root sequence according to its own cell ID, and the R11 interfering UE obtains a cyclic shift root sequence according to the virtual cell ID. All the UEs calculate the resource sequence number of the cyclic shift root sequence, the resource sequence number of the orthogonal code and the resource sequence number of the physical resource block according to the obtained resource index $n^{(1)}_{PUCCH}$. Then a channelization process is performed, and the channelization result is mapped to the corresponding time frequency resource.

Embodiment 7

Figure 15:
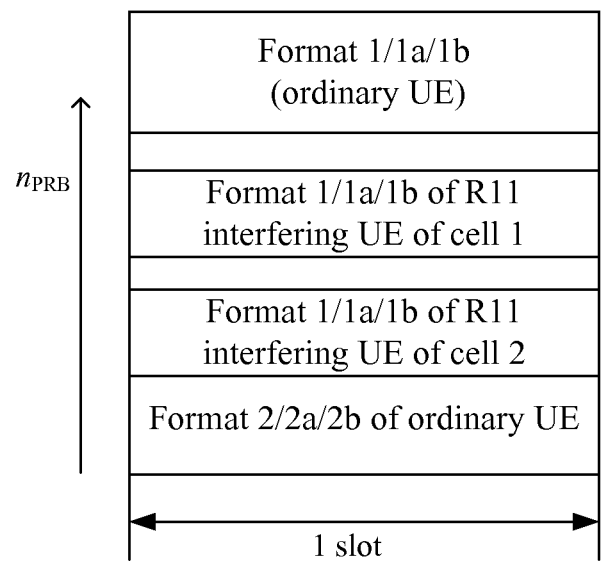
FIG. 15 is a schematic diagram showing a PUCCH inter-cell interference optimization scheme according to an embodiment of the disclosure.

This embodiment is described with respect to an FDD system, and in this embodiment, the base station employs the second method to allocate dedicated PRBs for the first type of UEs. FIG. 15 is a schematic diagram of a PUCCH inter-cell interference optimization solution, which solution takes the case where there are R11 interfering UEs in two cells as an example. According to the access situation of the UEs, the network side calculates relevant parameters of PUCCH of an ordinary UE, such as the resource indices of SR/semi-static ACK/NACK, the number of resource indices reserved for the SR/semi-static ACK/NACK and so on, according to the rules in R10, notifies a corresponding UE of the parameters via upper-layer signalling, and at the same time allocates (or reserves) the dedicated PRBs for the R11 interfering UE to send the PUCCH, wherein a part of dedicated PRBs are allocated to an R11 interfering UE in cell 1, marked as cell 1 PRB, and the remaining dedicated PRBs are allocated to an R11 interfering UE in cell 2, marked as cell 2 PRB. The network side respectively calculates the available resource values of cell 1 dedicated PRBs and cell 2 PRBs, and allocates these resources to the R11 interfering UEs of these two cells. Referring to FIG. 15, description is performed by taking the case where these PRBs are placed at the format2/2a/2b position of an ordinary UE as an example. When configuring the resources on dedicated PRBs, 4 resource values are allocated to each R11 interfering UE first and the UE is notified of the allocated resource values via upper-layer signalling, and two bits of the TPC domain of DCI format of PDCCH are used for indicating the currently employed resource value.

After receiving the network side indication, the UE obtains the resource index according to the following rules:

for an ordinary UE, the resource index is obtained through the following method:

(1) the resource index of the SR is obtained according to upper-layer configuration;

(2) in an FDD system, when only one serving cell is configured for a UE, the method for obtaining the resource index $n^{(1,\tilde{p})}_{PUCCH}$ of PUCCH format 1a/1b on subframe n is described as follows.

The first method: if the PDSCH of subframe n-4 of the main serving cell does not detect a corresponding PUCCH, then the $n^{(1,\tilde{p})}_{PUCCH}$ is obtained according to upper-layer configuration and Table 1. When the UE is configured with two antenna ports, each PUCCH resource value in the table corresponds to two resource indices, the first one is used for antenna port p0 and the second one is used for antenna port p1.

The second method: if the PDSCH of subframe n-4 of the main serving cell detects a corresponding PDCCH or the PDCCH is used for indicating downlink SPS release, then $n^{(1,\tilde{p})}_{PUCCH}$ is obtained according to the following formulae. With respect to an ordinary UE, for the first antenna port: $n^{(1,\tilde{p}=p_0)}_{PUCCH}=n_{CCE}+n^{(1)}_{PUCCH}$, where $n_{CCE}$ represents the first CCE index of the corresponding PDCCH; and for the second antenna port: $n^{(1,\tilde{p}=p_1)}_{PUCCH}=n_{CCE}+1+n^{(1)}_{PUCCH}$.

With respect to an R11 interfering UE, the resource index $n^{(1,\tilde{p})}_{PUCCH}$ thereof is obtained according to upper-layer configuration and Table 1. It is decided which one of these 4 upper-layer configured resources is used via the two bits in the TPC domain of a corresponding PDCCH, and the correlation between the bit values and the used resource can be seen in Table 1. When the UE is configured with two antenna ports, each PUCCH resource value in the table corresponds to two resource indices, the first one is used for antenna port p0 and the second one is used for antenna port p1.

The UE calculates a cyclic shift root sequence according to the original cell ID, calculates the resource sequence number of the cyclic shift root sequence, the resource sequence number of the orthogonal code and the resource sequence number of the physical resource block according to the obtained resource index $n^{(1,\tilde{p})}_{PUCCH}$. Then a channelization process is performed, and the channelization result is mapped to the corresponding time frequency resource.

The PRB position of the R11 interfering UE is unfixed, which can be located at any position within the frequency band, and the disclosure is not limited to this.

It can be seen from the above description that during PUCCH resource allocation, in the disclosure, by way of allocating dedicated resources for an R11 interfering UE and performing PUCCH transmission by all the UEs (including intra-cell and inter-cell) on these dedicated resources orthogonally, the problem of great interference between PUCCHs from different cells in CoMP scenario 3 is solved and the receiving quality of the PUCCH is ensured, and at the same time, the compatibility to LTE R8/9/10 versions is ensured.

Obviously, those skilled in the art should know that each of the mentioned modules or steps of the disclosure can be realized by universal computing devices; the modules or steps can be focused on single computing device, or distributed on the network formed by multiple computing devices; selectively, they can be realized by the program codes which can be executed by the computing device; thereby, the modules or steps can be stored in the storage device and executed by the computing device; and under some circumstances, the shown or described steps can be executed in different orders, or can be independently manufactured as each integrated circuit module, or multiple modules or steps thereof can be manufactured to be single integrated circuit module, thus to be realized. In this way, the disclosure is not restricted to any particular hardware and software combination.

The descriptions above are only the preferable embodiment of the disclosure, which are not used to restrict the disclosure, for those skilled in the art, the disclosure may have various changes and variations. Any amendments, equivalent substitutions, improvements, etc. within the principle of the disclosure are all included in the scope of the protection of the disclosure.

What is claimed is:

1. A physical uplink control channel (PUCCH) resource configuration method, comprising:
    a base station allocating dedicated physical resources blocks (PRBs) for user equipment (UE)s configured to transmit uplink control information using an enhanced PUCCH;
    a base station allocating orthogonal resources for UEs located in different cells among a first type of UEs based on the dedicated PRBs; and
    wherein the base station allocating the dedicated PRBs for the UEs configured to transmit the uplink control information using the enhanced PUCCH comprises: taking the UEs configured to transmit the uplink control information using the enhanced PUCCH as the first type of UEs, and taking UEs other than the first type of UEs as a second type of UEs; and respectively notifying the first type of UEs and the second type of UEs of different starting positions of dynamic acknowledgement (ACK)/negative acknowledgement (NACK) resources.

2. The method according to claim 1, wherein respectively notifying the first type of UEs and the second type of UEs of different starting positions of dynamic ACK/NACK resources comprises:
    calculating the total number $N^{(1)}_{PUCCH}$ of reserved resource indices and a downward offset value $\Delta^{(1)}_{PUCCH}$ according to access situations of the first type of UEs and the second type of UEs, wherein $\Delta^{(1)}_{PUCCH}$ is the number of dynamic ACK/NACK resource indices in the dedicated PRBs; and
    notifying the first type of UEs of the $\Delta^{(1)}_{PUCCH}$ via upper-layer signalling.

3. The method according to claim 1, wherein respectively notifying the first type of UEs and the second type of UEs of different starting positions of dynamic ACK/NACK resources comprises:
    calculating, according to the number of UEs in the first type of UEs and the number of the second type of UEs, the total number of reserved resource indices $N^{(1)}_{PUCCH,\ second\ type\ of\ UEs}$ and the number $N^{(1)}_{PUCCH,\ first\ type\ of\ UEs}$ of resource indices of SR as well as semi-static ACK/NACK reserved for the first type of UEs and the second type of UEs; and
    notifying the first type of UEs and the second type of UEs of $N^{(1)}_{PUCCH,\ first\ type\ of\ UEs}$ and $N^{(1)}_{PUCCH,\ second\ type\ of\ UEs}$ respectively via upper-layer signalling.

4. The method according to claim 1, wherein the base station allocating orthogonal resources for UEs located in different cells among the first type of Ins based on the dedicated PRBs comprises; setting a virtual cell identifier (ID) for each of the first type of UEs.

5. The method according to claim 4, wherein the virtual cell ID is set for each of the first type of UEs in one of the following manners:

setting a fixed virtual cell ID and configuring the cell ID to a corresponding UE in the first type of UEs;

selecting a virtual cell ID and notifying a corresponding UE in the first type of UEs of the cell ID via upper-layer signalling;

indicating a plurality of virtual cell IDs to the first type of UEs via upper-layer signalling and indicating a currently used cell ID via a corresponding physical downlink control channel (PDCCH); and notifying a corresponding UE in the first type of UEs or a virtual cell ID via a PDCCH.

6. The method according to claim 1, wherein the base station allocating the dedicated PRBs for the UEs configured to transmit the uplink control information using the enhanced PUCCH comprises:

allocating resource indices for the UEs configured to transmit the uplink control information using the enhanced PUCCH, wherein resource indices allocated to UEs located in different cells among the UEs configured to transmit the uplink control information using the enhanced PUCCH correspond to different PRBs.

7. The method according to claim 6, wherein the manner for allocating resource indices fix the UEs configured to transmit the uplink control information using the enhanced PUCCH comprises:

allocating a designated number of resource values for each UE among the UEs configured to transmit the uplink control information using the enhanced PUCCH, and indicating a resource value currently used by each UE via a corresponding physical downlink control channel (PDCCH).

8. The method according to claim 1, wherein respectively notifying the first type of UEs and the second type of UEs of different starting positions of dynamic ACK/NACK resources comprises:

reserving a designated number of PRBs according to the number of UEs in the first type of UEs, wherein the designated number of PRBs are located between scheduling request (SR) as well as semi-static ACK/NACK resources of the second type of UEs, and dynamic ACK/NACK resources of the second type of UEs, and taking the designated number of PRBs as dedicated PRBs for the first type of UEs.

9. A physical uplink control channel (PUCCH) transmission method, comprising:

a user equipment (UL) among a first type of UEs determining a resource index allocated to the UE according to network indication and a preconfigured resource determination manner, wherein the first type of UEs are UEs configured to transmit uplink control information using an enhanced PUCCH, UEs other than the first type of UEs are taken as a second type of UEs; and the first type of UEs and the second type of UEs are respectively notified of different starting positions of dynamic acknowledgement (ACK)/negative acknowledgement (NACK) resources; and the first type of UEs transmit a PUCCH according to the determined resource index.

10. The method according to claim 9, wherein the network indication comprises the total number of reserved resource indices $N^{(1)}_{PUCCH}$ and a downward offset value $\Delta^{(1)}_{PUCCH}$, and a UE among the first type of UEs determining the resource index allocated to the UE according to the network indication and the preconfigured resource determination manner comprises:

after receiving the $N^{(1)}_{PUCCH}$ and $\Delta^{(1)}_{PUCCH}$ the UE among the first type of UEs setting a dynamic ACK/NACK resource index to be a formula subtracting $\Delta^{(1)}_{PUCCH}$, wherein the formula is one by which the second type of UEs calculate a dynamic ACK/NACK resource index.

11. The method according to claim 9, wherein the network indication comprises: the number $N^{(1)}_{PUCCH,first\ type\ of\ UEs}$ of resource indices of SR as well as semi-static ACK/NACK reserved for the first type of UEs and the second type of UEs, and the total number $N^{(1)}_{PUCCH,second\ type\ of\ UEs}$ of reserved resource indices;

the UE among the first type of UEs determining the resource index allocated to the UE according to the network indication and the preconfigured resource determination manner comprises: after receiving $N^{(1)}_{PUCCH,first\ type\ of\ UEs}$, the first type of UEs determines a starting position of a dynamic ACK/NACK area according $N^{(1)}_{PUCCH,first\ type\ of\ UEs}$;

the method further comprises: after the second type of UEs receives $N^{(1)}_{PUCCH,second\ type\ of\ the\ UEs}$, the second type of UEs determining a starting position of a dynamic ACK/NACK area according to $N^{(1)}_{PUCCH,second\ type\ of\ the\ UEs}$.

12. The method according to claim 11, further comprising: when transmitting a PUCCH, the UP among the first type of UEs obtaining a cyclic shift root sequence according to a set virtual cell ID and performing channelization on the PUCCH according to the cyclic shift root sequence.

13. The method according to claim 9, wherein the UP among the first type of UEs determining the resource index allocated to the UP according to the network indication and the preconfigured resource determination manner comprises:

the UE among the first type of UEs determining the current resource index according to upper-layer parameters and corresponding PDCCH indication.

14. A physical uplink control channel (PUCCH) resource configuration device, comprising a hardware processor configured to execute software program units, wherein the software program units comprise:

a resource allocation module configured to allocate dedicated physical resources blocks (PRBs) for user equipment (UE)s configured to transmit uplink control information using an enhanced PUCCH; and a resource indication module configured to allocate orthogonal resources for UEs located in different cells among a first type of UEs based on the dedicated PRBs allocated by the resource allocation module; and the resource allocation module is configured to allocate the dedicated PRBs for the UEs configured to transmit the uplink control information using the enhanced PUCCH in the following manner; taking the UEs configured to transmit the uplink control information using the enhanced PUCCH as a first type of UEs, and taking UEs other than the first type of UEs as a second type of UEs; and respectively notifying the first type of UEs and the second type of UEs of different starting positions of dynamic acknowledgement (ACK)/negative acknowledgement (NACK) resources.

15. The device according to claim 14, wherein the resource allocation module comprises:
- a user classification unit configured to take the UEs configured to transmit the uplink control information using the enhanced PUCCH as the first type of UEs, and take the UEs other than the first type of UEs as the second type of UEs;
- a resource reservation unit configured to reserve the designated number of PRBs according to the number of UEs in the first type of UEs, wherein the designated number of PRBs are located between the SR as well as semi-static ACK/NACK, resources of the second type of UEs, and dynamic ACK/NACK resources of the second type of UEs; and
- a resource determination unit configured to take the designated number of PRBs reserved by the resource reservation unit as the dedicated PRBs for the first type of UEs.

16. The device according to claim 14, wherein the resource allocation module comprises:
- a resource allocation unit configured to allocate resource indices for UEs configured to transmit the uplink control information using the enhanced PUCCH, wherein the resource indices allocated to UEs located in different cells among the UEs configured to transmit the uplink control information using the enhanced PUCCH correspond to different PRBs.

17. A physical uplink control channel (PUCCH) transmission device, wherein the device is deployed in user equipment (UE) configured to transmit uplink control information using an enhanced PUCCH and the device comprises a hardware processor configured to execute software program units, wherein the software program units comprise:
- a resource index determination module configured to determine a resource index allocated to the UE according to network indication and a preconfigured resource determination manner; and
- a PUCCH transmission module configured to transmit a PUCCH according to the resource index determined by the resource index determination module, and wherein the UEs configured to transmit the uplink control information using the enhanced PUCCH are taken as the first type of UEs, and UEs other than the first type of UEs are taken as a second type of UEs; and the first type of UEs and the second type of UEs are respectively notified of different starting positions of dynamic acknowledgement (ACK)/negative acknowledgement (NACK) resources.

18. A physical uplink control channel (PUCCH) transmission system, comprising: a base station and a user equipment (UE) configured to transmit uplink control information using an enhanced PUCCH, wherein the UEs configured to transmit the uplink control information using the enhanced PUCCH are taken as the first type of UEs, and UEs other than the first type of UEs are taken as a second type of UEs; and the first type of UEs and the second type of UEs are respectively notified of different starting positions of dynamic acknowledgement (ACK)/negative acknowledgement (NACK) resources, wherein;
- the base station comprises a PUCCH resource configuration device, wherein the PUCCH resource configuration device comprises: a resource allocation module configured to allocate dedicated physical resource blocks (PRBs) for UEs configured to transmit uplink control information using an enhanced PUCCH; and a resource indication module configured to allocate orthogonal resources for UEs located in different cells among the first type of UEs based on the dedicated PRBs allocated by the resource allocation module; and
- the UE comprises a PUCCH transmission device, wherein the PUCCH transmission device comprises: a resource index determination module configured to determine a resource index allocated to the UE according to network indication and a preconfigured resource determination manner; and a PUCCH transmission module configured to transmit a PUCCH according to the resource index determined by the resource index determination module.

* * * * *